(12) United States Patent
Yamada et al.

(10) Patent No.: US 11,733,027 B2
(45) Date of Patent: *Aug. 22, 2023

(54) LASER INTERFEROMETER

(71) Applicant: Seiko Epson Corporation, Tokyo (JP)

(72) Inventors: Kohei Yamada, Shiojiri (JP); Takeshi Shimizu, Chino (JP)

(73) Assignee: SEIKO EPSON CORPORATION

( * ) Notice: Subject to any disclaimer, the term of this patent is extended or adjusted under 35 U.S.C. 154(b) by 1 day.

This patent is subject to a terminal disclaimer.

(21) Appl. No.: 17/411,231

(22) Filed: Aug. 25, 2021

(65) Prior Publication Data

US 2022/0065614 A1 Mar. 3, 2022

(30) Foreign Application Priority Data

Aug. 26, 2020 (JP) .................. 2020-142497

(51) Int. Cl.
*G01B 9/02002* (2022.01)
*G01B 9/02* (2022.01)
*G02B 5/04* (2006.01)

(52) U.S. Cl.
CPC ..... *G01B 9/02002* (2013.01); *G01B 9/02083* (2013.01); *G01B 2290/70* (2013.01); *G02B 5/04* (2013.01)

(58) Field of Classification Search
CPC .............. G01B 9/0201; G01B 9/02045; G01B 9/02083; G02F 1/11; G02F 2/00; G01P 3/363; G01P 3/366
See application file for complete search history.

(56) References Cited

U.S. PATENT DOCUMENTS

| 4,289,403 | A | | 9/1981 | Allington | |
|---|---|---|---|---|---|
| 5,925,968 | A | * | 7/1999 | Yachi | .............. H03H 9/0509 |
| | | | | | 310/366 |
| 6,381,015 | B1 | * | 4/2002 | Sonehara | ............... G01N 21/45 |
| | | | | | 356/497 |
| 2012/0056684 | A1 | | 3/2012 | Kishi et al. | |
| 2020/0309953 | A1 | | 10/2020 | Yamada | |
| 2022/0065612 | A1 | * | 3/2022 | Yamada | ............. G01B 9/02083 |
| 2022/0065892 | A1 | | 3/2022 | Yamada | |

FOREIGN PATENT DOCUMENTS

| JP | H02-038889 | A | | 2/1990 | |
|---|---|---|---|---|---|
| JP | H09-054293 | A | | 2/1997 | |
| JP | 2007-285898 | A | | 11/2007 | |
| JP | 2012060259 | A | * | 3/2012 | ............... H03H 3/02 |
| JP | 2020-165700 | A | | 10/2020 | |

* cited by examiner

*Primary Examiner* — Michael A Lyons
(74) *Attorney, Agent, or Firm* — Harness, Dickey & Pierce, P.L.C.

(57) ABSTRACT

A laser interferometer includes a light source that emits first laser light, an optical modulator that includes a vibrator and modulates the first laser light by using the vibrator to generate second laser light including a modulated signal, a photodetector that receives interference light between third laser light including a sample signal generated by reflecting the first laser light on an object and the second laser light to output a light reception signal, a demodulation circuit that demodulates the sample signal from the light reception signal based on a reference signal, and an oscillation circuit that outputs the reference signal to the demodulation circuit, and the vibrator is a signal source of the oscillation circuit.

12 Claims, 11 Drawing Sheets

RELATIONSHIP BETWEEN LOAD CAPACITANCE $C_L$ OF OSCILLATION CIRCUIT AND ACCURACY OF MEASUREMENT RESULT

LASER INTERFEROMETER

The present application is based on, and claims priority from JP Application Serial Number 2020-142497, filed Aug. 26, 2020, the disclosure of which is hereby incorporated by reference herein in its entirety.

BACKGROUND

1. Technical Field

The present disclosure relates to a laser interferometer.

2. Related Art

JP-A-9-54293 discloses a laser Doppler velocimeter that irradiates a vibrating object with a laser beam and measures the velocity of the object by using a frequency of the laser beam changed by the Doppler effect. In order to detect the directionality of the vibration phenomenon of the object, the laser Doppler velocimeter requires a structure for modulating light emitted from a laser light source. Therefore, JP-A-9-54293 discloses that an acousto-optic modulator or an electro-optical modulator is used.

A radio frequency (RF) signal output from an oscillation circuit is input to the acousto-optic modulator or the electro-optical modulator described in JP-A-9-54293. As a result, the refractive indexes of optical elements provided in the optical modulators are changed to modulate the light.

When the vibrating object is irradiated with the light emitted from the laser light source, the light is reflected and return light is generated. Since the return light causes Doppler shift, a beat signal is generated by interfering with reference light. By passing this beat signal through a demodulator, the vibration velocity of the object can be obtained. Normally, in a demodulator, demodulation is performed by using a reference signal generated from the oscillation circuit.

The oscillation circuit is a circuit that outputs a desired frequency signal by using a signal source such as a quartz crystal resonator as a vibration source. However, the oscillation of the quartz crystal resonator has a temperature characteristic. Therefore, there is a problem that when the oscillation is affected by the temperature change, the frequency of the signal output from the oscillation circuit changes.

Meanwhile, the modulation of light by the above-mentioned optical modulator also has the temperature characteristic. Therefore, when the modulation is affected by the temperature change, the modulation frequency by the optical modulator changes.

However, the temperature characteristic of the optical modulator is different from the temperature characteristic of the quartz crystal resonator. This deviation in temperature characteristics affects the measurement results of the laser Doppler velocimeter. As a result, there is a problem that the accuracy of the measurement velocity is lowered.

SUMMARY

A laser interferometer according to an application example of the present disclosure includes: a light source that emits first laser light; an optical modulator that includes a vibrator and modulates the first laser light by using the vibrator to generate second laser light including a modulated signal; a photodetector that receives interference light between third laser light including a sample signal generated by reflecting the first laser light on an object and the second laser light to output a light reception signal; a demodulation circuit that demodulates the sample signal from the light reception signal based on a reference signal; and an oscillation circuit that outputs the reference signal to the demodulation circuit, in which the vibrator is a signal source of the oscillation circuit.

DESCRIPTION OF EXEMPLARY EMBODIMENTS

Hereinafter, a laser interferometer of the present disclosure will be described in detail based on the embodiments shown in the accompanying drawings.

Figure 1:
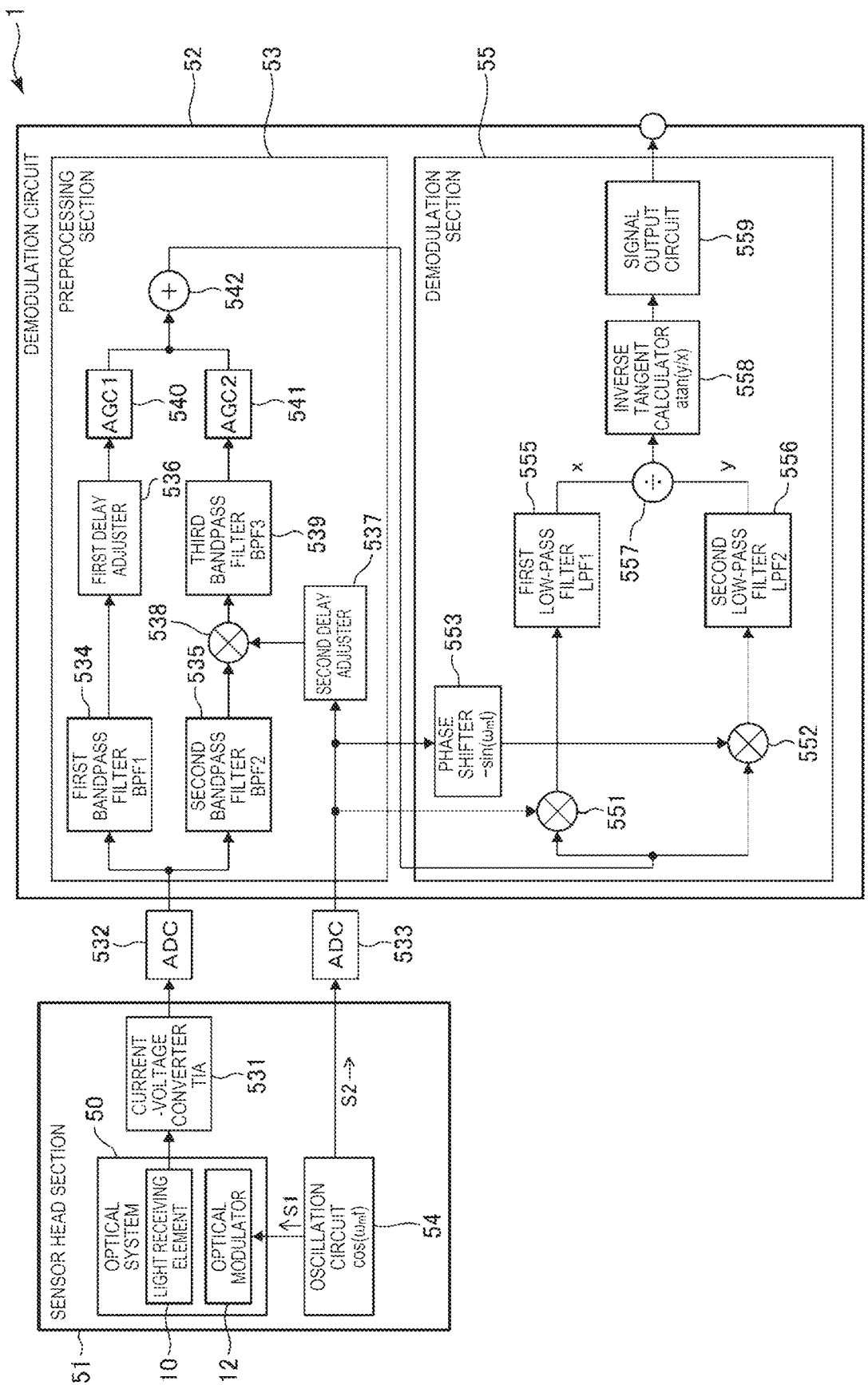
FIG. 1 is a functional block diagram showing a laser interferometer according to an embodiment.

FIG. 1 is a functional block diagram showing a laser interferometer according to an embodiment.

A laser interferometer 1 shown in FIG. 1 has a sensor head section 51 provided with an optical system 50, a demodulation circuit 52 to which a light reception signal from the optical system 50 is input, and an oscillation circuit 54 that outputs a reference signal to the demodulation circuit 52.

1. Sensor Head Section

Figure 2:
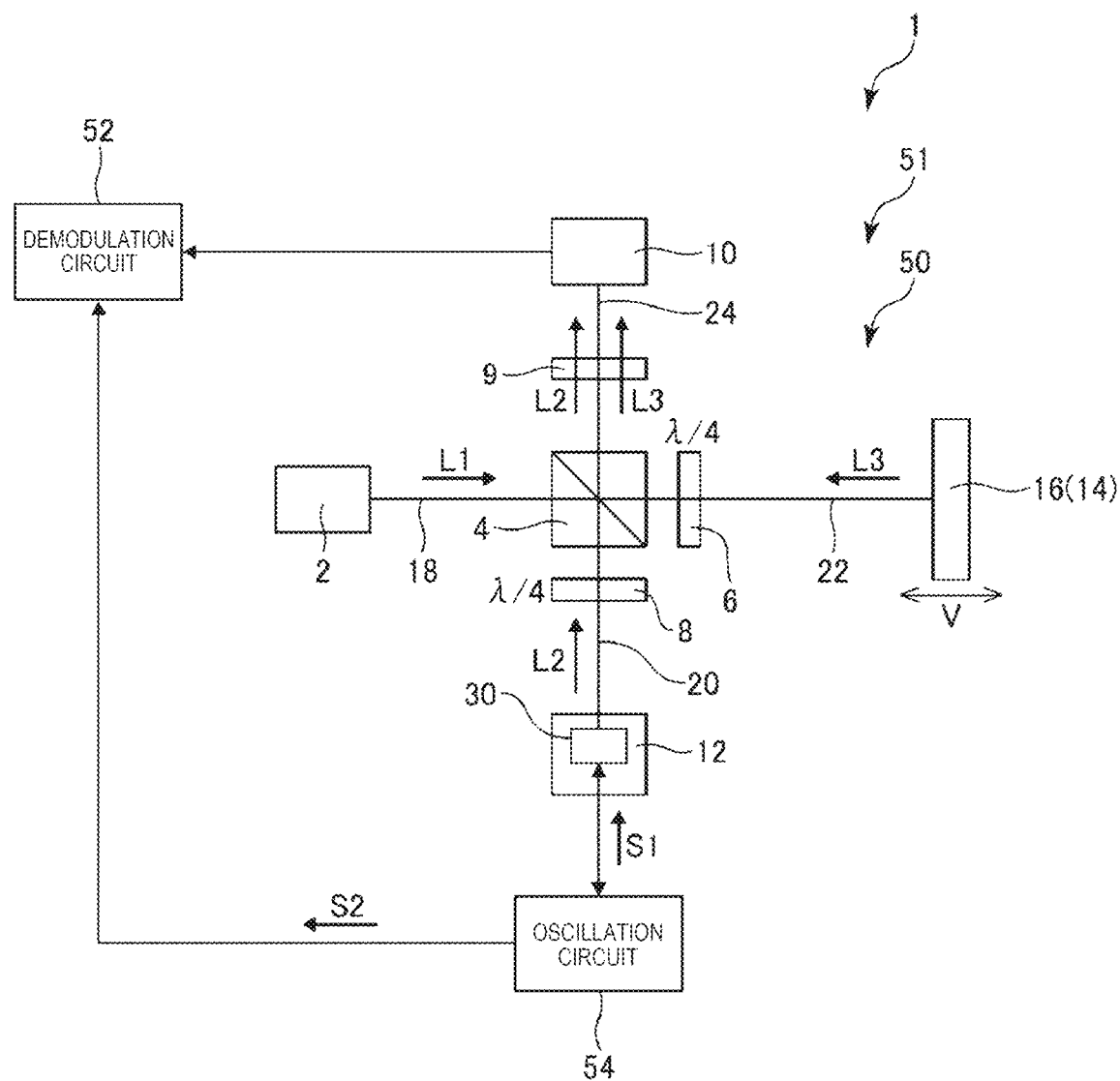
FIG. 2 is a schematic configuration diagram showing a sensor head section and an optical system shown in FIG. 1.

FIG. 2 is a schematic configuration diagram showing the sensor head section 51 and the optical system 50 shown in FIG. 1.

The optical system 50 includes a light source 2, a polarization beam splitter 4, a quarter wave plate 6, a quarter wave plate 8, an optical analyzer 9, a photodetector 10, a frequency shifter type optical modulator 12, and a set section 16 in which an object 14 to be measured is arranged.

The light source 2 emits emission light L1 (first laser light) having a predetermined wavelength. The photodetector 10 converts the received light into an electric signal. The optical modulator 12 includes a vibrator 30 and modulates the emission light L1 to generate reference light L2 (second laser light) including a modulated signal. The set section 16 may be provided as needed, and the object 14 to be measured can be arranged therein. The emission light L1 incident on the object 14 to be measured is reflected as object light L3 (third laser light) including a sample signal derived from the object 14 to be measured.

The optical path of the emission light L1 emitted from the light source 2 is referred to as an optical path 18. The optical path 18 is coupled to the optical path 20 by the reflection of the polarization beam splitter 4. On the optical path 20, the quarter wave plate 8 and the optical modulator 12 are arranged in this order from the polarization beam splitter 4 side. Further, the optical path 18 is coupled to an optical path 22 by the transmission of the polarization beam splitter 4. On the optical path 22, the quarter wave plate 6 and the set section 16 are arranged in this order from the polarization beam splitter 4 side.

The optical path 20 is coupled to an optical path 24 by the transmission of the polarization beam splitter 4. On the optical path 24, the optical analyzer 9 and the photodetector 10 are arranged in this order from the polarization beam splitter 4 side.

The emission light L1 emitted from the light source 2 enters the optical modulator 12 via the optical path 18 and the optical path 20. Further, the emission light L1 enters the object 14 to be measured via the optical path 18 and the optical path 22. The reference light L2 generated by the optical modulator 12 enters the photodetector 10 via the optical path 20 and the optical path 24. The object light L3 generated by the reflection from the object 14 to be measured enters the photodetector 10 via the optical path 22 and the optical path 24.

Hereinafter, each section of the laser interferometer 1 will be described in sequence.

1.1. Light Source

The light source 2 is a laser light source that emits an emission light L1 with a narrow line width having coherence. When the line width is displayed by frequency difference, a laser light source having a line width of MHz band or less is preferably used. Specifically, gas lasers such as HeNe lasers, and semiconductor laser elements such as a distributed feedback-laser diode (DFB-LD), a laser diode with fiber bragg grating (FBG-LD), or a vertical cavity surface emitting laser (VCSEL) can be exemplified.

The light source 2 preferably includes a semiconductor laser element. This makes it possible to make the light source 2 particularly miniaturized. Therefore, the laser interferometer 1 can be made smaller in size. In particular, the sensor head section 51 in the laser interferometer 1, in which the optical system 50 is accommodated, can be made smaller and lighter, and thus it is also useful in that the operability of the laser interferometer 1 can be improved.

1.2. Polarization Beam Splitter

The polarization beam splitter 4 is an optical element that splits the incident light into transmitted light and reflected light. Further, the polarization beam splitter 4 has a function of transmitting P-polarized light and reflecting S-polarized light, and can divide the polarization state of the incident light into orthogonal components. Hereinafter, a case where the emission light L1 which is linearly polarized light and has a ratio between the P-polarized light and the S-polarized light of, for example, 50:50 is incident on the polarization beam splitter 4 will be considered.

As described above, the polarization beam splitter 4 reflects the S-polarized light of the emission light L1 and transmits the P-polarized light.

The S-polarized light of the emission light L1 reflected by the polarization beam splitter 4 is converted into circularly polarized light at the quarter wave plate 8 and incident on the optical modulator 12. The circularly polarized light of the emission light L1 incident on the optical modulator 12 undergoes a frequency shift of $f_m$ [Hz] and is reflected as the reference light L2. Therefore, the reference light L2 includes a modulated signal having a modulation frequency of $f_m$ [Hz]. The reference light L2 is converted into the P-polarized light when the reference light L2 passes through the quarter wave plate 8 again. The P-polarized light of the reference light L2 passes through the polarization beam splitter 4 and the optical analyzer 9 and is incident on the photodetector 10.

The P-polarized light of the emission light L1 passing through the polarization beam splitter 4 is converted into circularly polarized light at the quarter wave plate 6 and incident on the object 14 to be measured in a moving state. The circularly polarized light of the emission light L1 incident on the object 14 to be measured undergoes a Doppler shift of $f_d$ [Hz] and is reflected as the object light L3. Therefore, the object light L3 includes a frequency signal having a frequency of $f_d$ [Hz]. The object light L3 is converted into the S-polarized light when the object light L3 passes through the quarter wave plate 6 again. The S-polarized light of the object light L3 is reflected by the polarization beam splitter 4, passes through the optical analyzer 9, and is incident on the photodetector 10.

As described above, since the emission light L1 has coherence, the reference light L2 and the object light L3 are incident on the photodetector 10 as interference light.

A non-polarization beam splitter may be used instead of the polarization beam splitter. In this case, since the quarter wave plate 6 and the quarter wave plate 8 are not required, the laser interferometer 1 can be made smaller by reducing the number of parts.

1.3. Optical Analyzer

Since the S-polarized light and the P-polarized light that are orthogonal to each other are independent of each other, interference does not appear by simply superimposing them. Therefore, a light wave obtained by superimposing the S-polarized light onto the P-polarized light is passed through the optical analyzer 9 tilted by 45° with respect to both S-polarized light and P-polarized light. By using the optical analyzer 9, light of the components common to each other can be transmitted to cause interference. As a result, in the optical analyzer 9, the modulated signal and the sample signal interfere with each other, and interference light having a frequency of $f_m-f_d$ [Hz] is generated.

1.4. Photodetector

The reference light L2 and the object light L3 are incident on the photodetector 10 via the polarization beam splitter 4 and the optical analyzer 9. Thereby, the reference light L2 and the object light L3 interfere with each other by optical heterodyne, and the interference light having a frequency of $f_m-f_d$ [Hz] is incident on the photodetector 10. By demodulating the sample signal from the interference light by the method to be described later, the movement of the object 14 to be measured, that is, the velocity and the vibration can be finally obtained. Examples of the photodetector 10 include a photodiode and the like.

1.5. Optical Modulator

Figure 3:
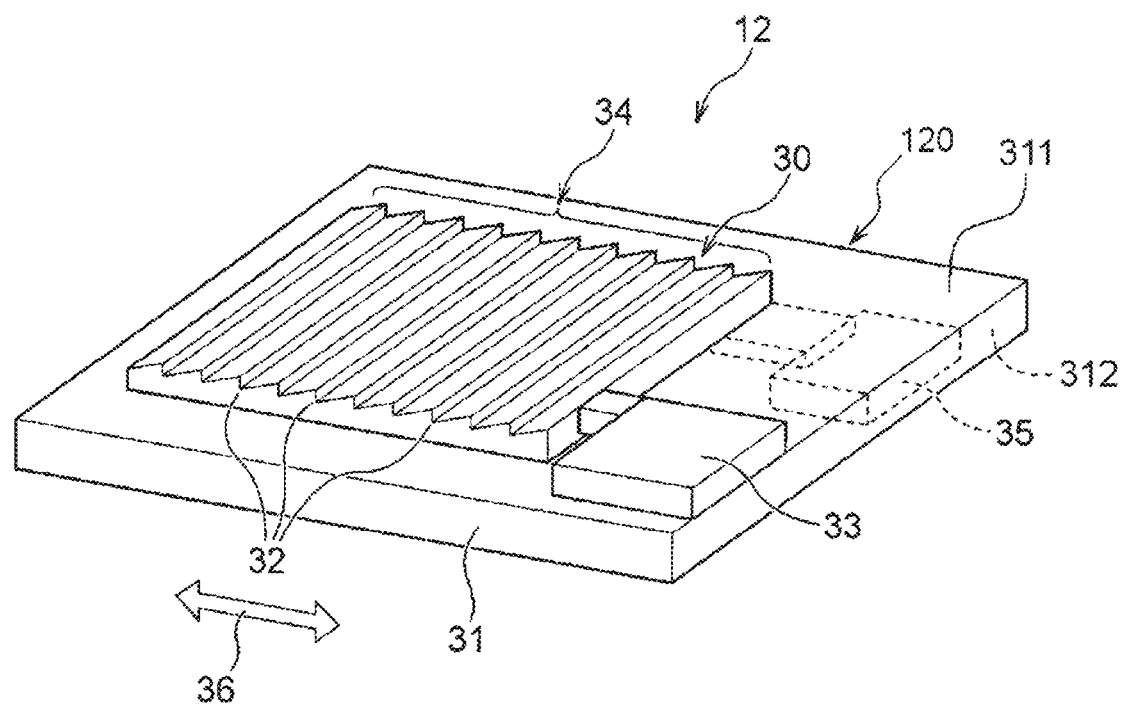
FIG. 3 is a perspective view showing a first configuration example of an optical modulator shown in FIG. 2.

FIG. 3 is a perspective view showing a first configuration example of the optical modulator 12 shown in FIG. 2.

1.5.1. Outline of Optical Modulator According to First Configuration Example The frequency shifter type optical modulator 12 has an optical modulation resonator 120. The optical modulation resonator 120 includes a plate-shaped vibrator 30 and a substrate 31 that supports the vibrator 30.

The vibrator 30 is made of a material that repeats a mode of vibrating so as to be distorted in a direction along a surface by applying an electric potential. In the present embodiment, the vibrator 30 is a quartz crystal AT resonator that vibrates by thickness sliding along a vibration direction 36 in the high frequency region of the MHz band. A diffraction grating 34 is formed on the surface of the vibrator 30. The diffraction grating 34 has a structure in which a plurality of linear grooves 32 are arranged at regular intervals.

The substrate 31 has a front surface 311 and a back surface 312 having a front and back relationship with each other. The vibrator 30 is arranged on the front surface 311. Further, the front surface 311 is provided with a pad 33 for applying an electric potential to the vibrator 30. On the other hand, the back surface 312 is also provided with a pad 35 for applying an electric potential to the vibrator 30.

The size of the substrate 31 is, for example, about 0.5 mm or more and 10.0 mm or less on the long side. The thickness of the substrate 31 is, for example, about 0.1 mm or more and 2.0 mm or less. As an example, the substrate 31 has a shape of a square with a side of 1.6 mm and has a thickness of 0.35 mm.

The size of the vibrator 30 is, for example, about 0.2 mm or more and 3.0 mm or less on the long side. The thickness of the vibrator 30 is, for example, about 0.003 mm or more and 0.5 mm or less.

As an example, the vibrator 30 has a shape of a square with a side of 1.0 mm and has a thickness of 0.07 mm. In this case, the vibrator 30 oscillates at a basic oscillation frequency of 24 MHz. The oscillation frequency can be adjusted in the range of 1 MHz to 1 GHz by changing the thickness of the vibrator 30 and even considering overtones.

In FIG. 3, the diffraction grating 34 is formed on the entire surface of the vibrator 30, but it may be formed only on a part of the surface.

The intensity of the optical modulation by the optical modulator 12 is given by a dot product of a difference wave vector between a wave vector of the emission light L1 incident on the optical modulator 12 and a wave vector of the emission light L2 emitted from the optical modulator 12 and a vector of the vibrator 30 in the vibration direction 36. In the present embodiment, since the vibrator 30 vibrates by thickness sliding and this vibration is in-plane vibration, optical modulation cannot be performed even if light is incident perpendicularly to the surface of the vibrator 30 alone. Therefore, in the present embodiment, by providing the diffraction grating 34 in the vibrator 30, optical modulation can be performed by a principle to be described later.

The diffraction grating 34 shown in FIG. 3 is a blazed diffraction grating. The blazed diffraction grating is one in which the cross-sectional shape of the diffraction grating is stepped. The linear groove 32 of the diffraction grating 34 is provided such that its extending direction is orthogonal to the vibration direction 36.

When a drive signal S1 is supplied from the oscillation circuit 54 shown in FIG. 1 to the vibrator 30 shown in FIG. 3 (an AC voltage is applied), the vibrator 30 oscillates. The electric power (driving power) required for the oscillation of the vibrator 30 is not particularly limited, but is as small as about 0.1 μW to 100 mW. Therefore, the drive signal S1 output from the oscillation circuit 54 can be used to oscillate the vibrator 30 without amplification.

1.5.2. Method of Forming Diffraction Grating

The method of forming the diffraction grating 34 is not particularly limited, but as an example, a method may be provided in which the mold is formed by a method using a mechanical engraving type (ruling engine), and the groove 32 is formed on an electrode formed on the surface of the vibrator 30 of the quartz crystal AT resonator by the nanoimprint method. Here, the reason why the groove 32 is formed on the electrode is that in the case of the quartz crystal AT resonator, in principle, high-quality thickness sliding vibration can be generated on the electrode. The groove 32 is not limited to being formed on the electrode, but may be formed on the surface of the material of the non-electrode portion. Further, instead of the nanoimprint method, a processing method by exposure and etching, an electron beam drawing lithography method, a focused ion beam processing method (FIB), or the like may be used.

Further, a diffraction grating of a resist material may be formed on the chip of the quartz crystal AT resonator, and a metal film or a mirror film made of a dielectric multilayer film may be provided therein. By providing the metal film or the mirror film, the reflectance of the diffraction grating 34 can be increased.

Further, the metal film or the mirror film may be formed on a processed surface after forming the resist film on the chip or the wafer of the quartz crystal AT resonator, performing etching processing, and then removing the resist film. In this case, since the resist material is removed, the influence of moisture absorption of the resist material or the like is eliminated, and the stability of the diffraction grating 34 can be improved. Further, by providing a highly conductive metal film such as Au or Al, it is also possible to be used as an electrode for driving the vibrator 30.

The diffraction grating 34 may be formed by using a technique such as anodized alumina (porous alumina).

1.5.3. Optical Modulator According to Another Configuration Example

The vibrator 30 is not limited to the quartz crystal resonator, and may be, for example, a Si resonator, a surface acoustic wave (SAW) device, or the like.

Figure 4:
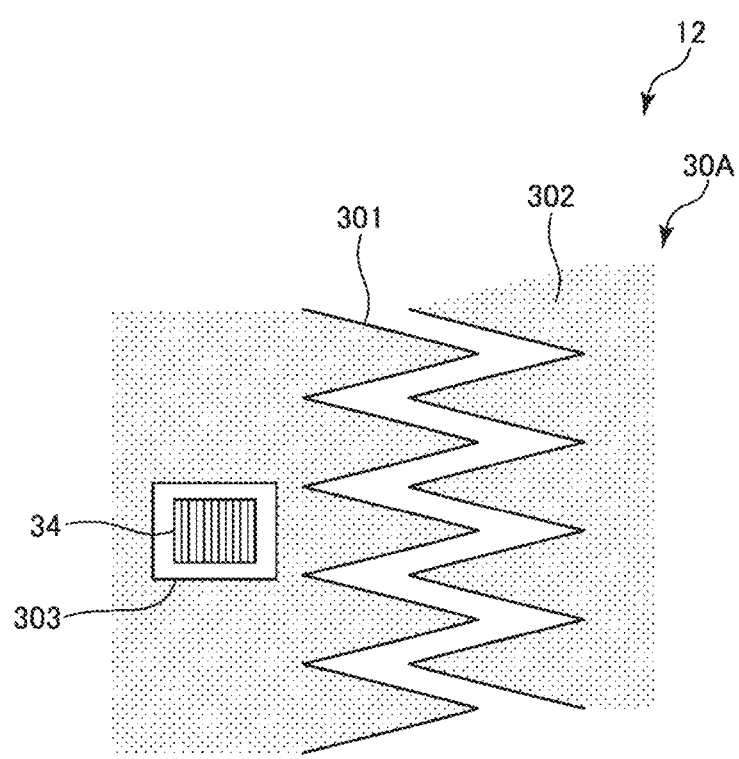
FIG. 4 is a plan view showing a part of a second configuration example of the optical modulator.
Figure 5:
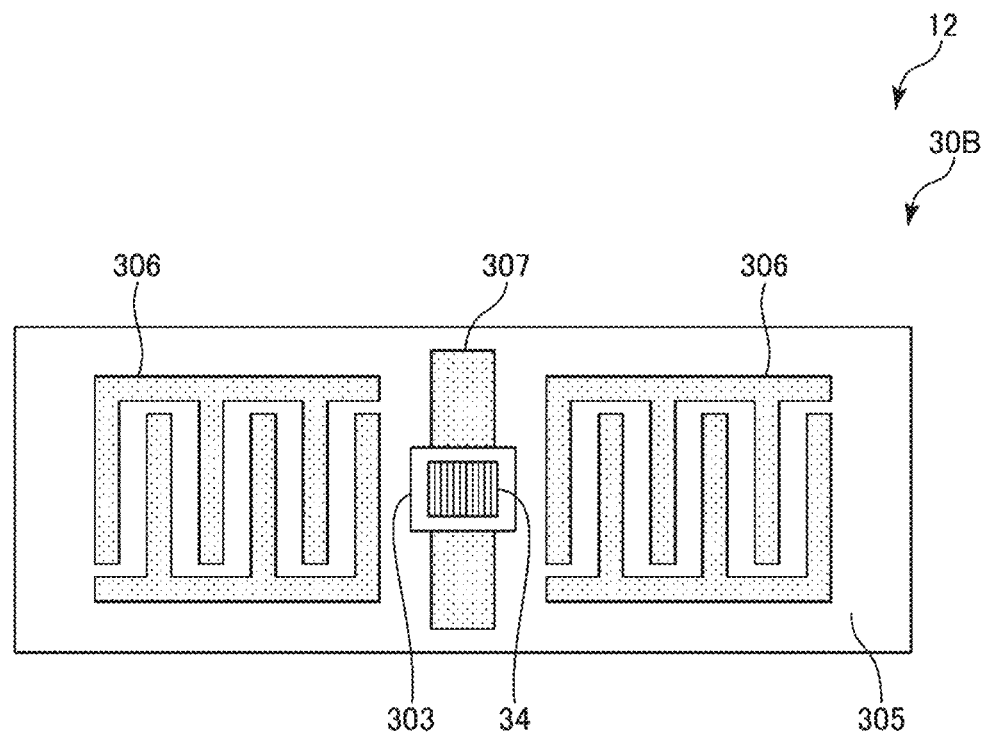
FIG. 5 is a plan view showing a third configuration example of the optical modulator.

FIG. 4 is a plan view showing a part of a second configuration example of the optical modulator 12. FIG. 5 is a plan view showing a third configuration example of the optical modulator 12.

A vibrator 30A shown in FIG. 4 is a Si resonator manufactured by using the MEMS technique. MEMS stands for Micro Electro Mechanical Systems.

The vibrator 30A includes a first electrode 301 and a second electrode 302 adjacent to each other on the same plane with a gap, a diffraction grating mounting portion 303 provided on the first electrode 301, and the diffraction grating 34 provided on the diffraction grating mounting portion 303. For example, the first electrode 301 and the second electrode 302 vibrate in the left-right direction of FIG. 4 so as to repeatedly approach and separate from each other by using an electrostatic attraction force as a driving force. Thereby, in-plane vibration can be applied to the diffraction grating 34. The oscillation frequency of the Si resonator is, for example, about 1 kHz to several hundred MHz.

A vibrator 30B shown in FIG. 5 is a SAW device that utilizes surface waves. SAW stands for a Surface Acoustic Wave.

The vibrator 30B includes a piezoelectric substrate 305, inter digital transducers 306 provided on the piezoelectric substrate 305, a ground electrode 307, the diffraction grating mounting portion 303, and the diffraction grating 34. When an AC voltage is applied to the inter digital transducer, the surface wave is excited by the inverse piezoelectric effect. Thereby, in-plane vibration can be applied to the diffraction grating 34. The oscillation frequency of the SAW device is, for example, several hundred MHz to several GHz.

By providing the diffraction grating 34 in the above-mentioned device as well, optical modulation can be performed by the principle to be described later, as in the case of the quartz crystal AT resonator.

On the other hand, when the vibrator 30 has the quartz crystal resonator, a highly accurate modulated signal can be generated by utilizing an extremely high Q value of the quartz crystal. The Q value is an index showing the sharpness of the peak of resonance. Further, as a feature of the quartz crystal resonator, it is not easily affected by disturbance. Therefore, by using the modulated signal modulated by the optical modulator 12 including the quartz crystal resonator, a sample signal derived from the object 14 to be measured can be acquired with high accuracy.

1.5.4. Optical Modulation by Vibrator

Next, the principle of modulating light by using the optical modulator 12 shown in FIG. 3 will be described.

Figure 6:
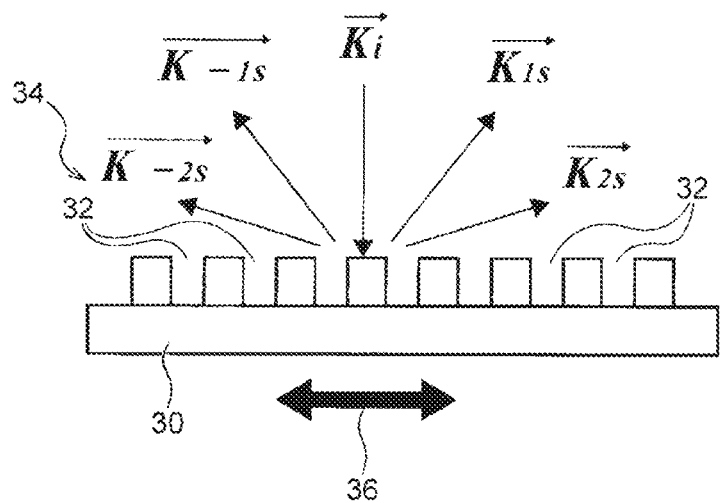
FIG. 6 is a conceptual diagram illustrating that a plurality of diffracted light beams are generated when incident light is incident in a direction perpendicular to a surface of a vibrator shown in FIG. 3.

FIG. 6 is a conceptual diagram illustrating that a plurality of diffracted light beams are generated when incident light $K_i$ is incident in a direction perpendicular to the surface of the vibrator 30 shown in FIG. 3.

When the incident light $K_i$ is incident on the diffraction grating 34 that is vibrating by thickness sliding along the vibration direction 36, a plurality of diffracted light beams $K_{ns}$ are generated as shown in FIG. 6 due to the diffraction phenomenon. n is the order of the diffracted light $K_{ns}$, and n=0, ±1, ±2, . . . . It is to be noted that, in FIG. 6, the diffraction grating 34 is not the blazed diffraction grating shown in FIG. 3, but a diffraction grating made by repeated irregularities as an example of another diffraction grating.

In FIG. 6, the incident light $K_i$ is incident in a direction perpendicular to the surface of the vibrator 30; however, the incident angle is not particularly limited and may be set so that the incident light is obliquely incident on the surface of the vibrator 30. When the light is incident at an angle, the traveling direction of the diffracted light beam $K_{ns}$ also changes accordingly.

Depending on the design of the diffraction grating 34, a higher-order light beam of |n|≥2 may not appear. Therefore, in order to obtain a stable modulated signal, it is desirable to set |n|=1. That is, in the laser interferometer 1 of FIG. 2, the frequency shifter type optical modulator 12 is preferably arranged so that the ±1st-order diffracted light is used as the reference light L2. With this arrangement, it is possible to achieve stabilization of measurement by the laser interferometer 1.

On the other hand, when higher-order light of |n|≥2 appears from the diffraction grating 34, the optical modulator 12 may be arranged so that any diffracted light of ±2nd order or higher is used as the reference light L2 instead of the ±1st-order diffracted light. Thereby, higher-order diffracted light can be used, and thus the laser interferometer 1 can be made higher in frequency and smaller in size.

In the present embodiment, as an example, the optical modulator 12 is configured such that the angle formed by an entering direction of the incident light $K_i$ incident on the optical modulator 12 and the traveling direction of the reference light L2 emitted from the optical modulator 12 is 180 degrees. Hereinafter, three configuration examples will be described.

Figure 7:
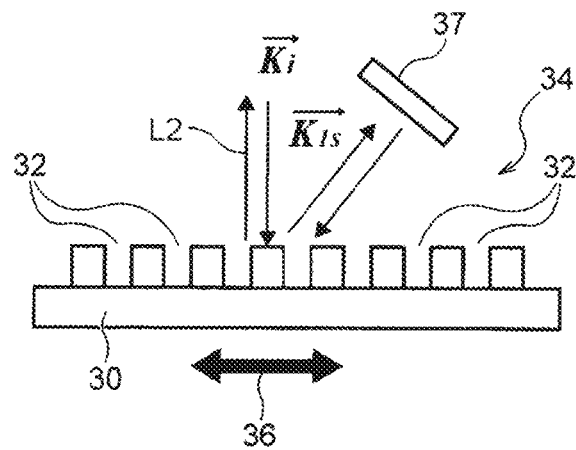
FIG. 7 is a conceptual diagram illustrating an optical modulator configured such that an angle formed by a traveling direction of incident light and a traveling direction of reference light is 180 degrees.
Figure 8:
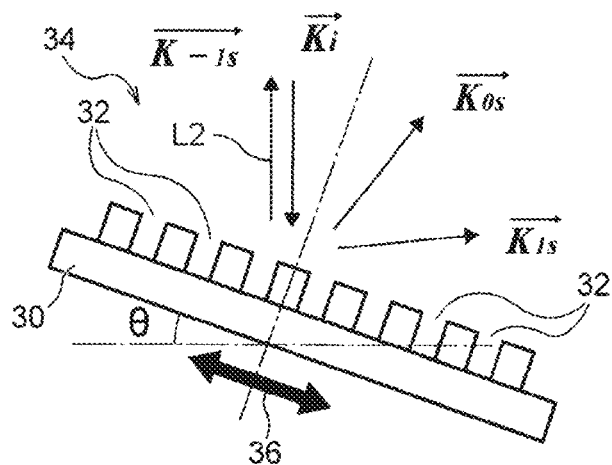
FIG. 8 is a conceptual diagram illustrating an optical modulator configured such that the angle formed by the traveling direction of the incident light and the traveling direction of the reference light is 180 degrees.
Figure 9:
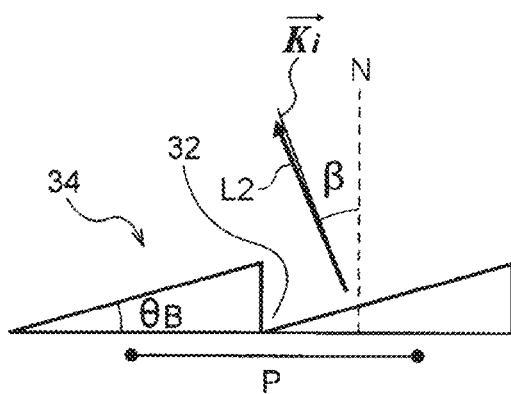
FIG. 9 is a conceptual diagram illustrating an optical modulator configured such that the angle formed by the traveling direction of the incident light and the traveling direction of the reference light is 180 degrees.

FIGS. 7 to 9 are conceptual diagrams illustrating the optical modulator 12 configured such that an angle formed by the traveling direction of the incident light $K_i$ and the traveling direction of the reference light L2 is 180 degrees.

In FIG. 7, the optical modulator 12 includes a mirror 37 in addition to the vibrator 30. The mirror 37 is arranged so as to reflect diffracted light $K_{1s}$ and return it to the diffraction grating 34. At this time, the angle formed by the incident angle of the diffracted light $K_{1s}$ with respect to the mirror 37 and the reflection angle of the mirror 37 is 180 degrees. As a result, the diffracted light $K_{1s}$ emitted from the mirror 37 and returned to the diffraction grating 34 is diffracted again by the diffraction grating 34, and travels in the direction opposite to the traveling direction of the incident light $K_i$ incident on the optical modulator 12. Therefore, by adding the mirror 37, it is possible to satisfy the condition that the angle formed by the entering direction of the incident light $K_i$ and the traveling direction of the reference light L2 is 180 degrees, as described above.

By passing through the mirror 37 in this way, the reference light L2 generated by the optical modulator 12 is subjected to frequency modulation twice. Therefore, by using the mirror 37 together, the frequency modulation of a high frequency becomes possible as compared with the case where the vibrator 30 alone is used.

In FIG. 8, the vibrator 30 is tilted with respect to the arrangement shown in FIG. 6. An inclination angle θ at this time is set so as to satisfy the condition that the angle formed by the entering direction of the incident light $K_i$ and the traveling direction of the reference light L2 is 180 degrees.

The diffraction grating 34 shown in FIG. 9 is a blazed diffraction grating having a blaze angle $θ_B$. Then, when the incident light $K_i$ traveling at an incident angle β is incident on the diffraction grating 34 with respect to a normal line N on the surface of the vibrator 30, the reference light L2 returns at the same angle as the blaze angle $θ_B$ with respect to the normal line N. Therefore, by making the incident angle β equal to the blaze angle $θ_B$, it is possible to satisfy the condition that the angle formed by the entering direction of the incident light $K_i$ and the traveling direction of the reference light L2 is 180 degrees, as described above. In this case, since the above conditions can be satisfied without using the mirror 37 shown in FIG. 7 and without tilting the vibrator 30 itself as shown in FIG. 8, the laser interferometer 1 can be further miniaturized and have a higher frequency. In particular, in the case of a blazed diffraction grating, an arrangement satisfying the above conditions is called a "Littrow arrangement", and there is an advantage that the diffraction efficiency of the diffracted light can be particularly improved.

A pitch P in FIG. 9 represents the pitch of the blazed diffraction grating, and as an example, the pitch P is 1 μm. The blaze angle $θ_B$ is 25 degrees. In this case, in order to satisfy the above conditions, the incident angle β with respect to the normal line N of the incident light $K_i$ may be set to 25 degrees.

1.5.5. Package Structure

Figure 10:
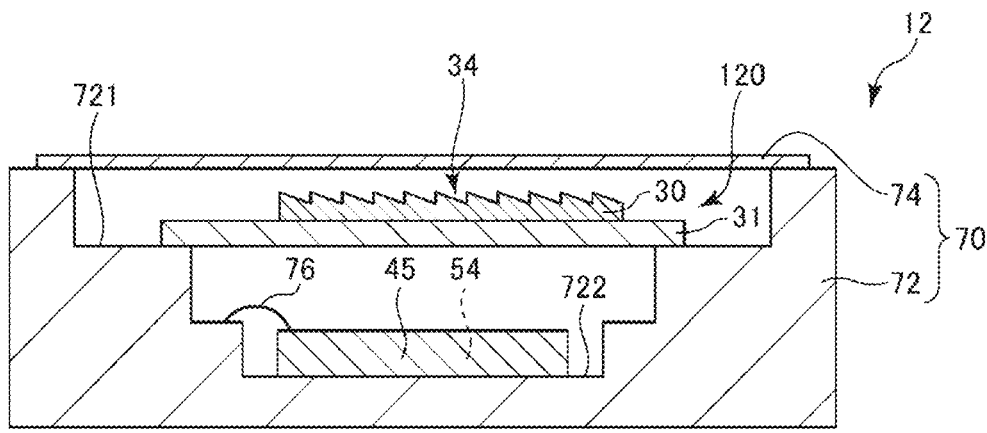
FIG. 10 is a cross-sectional view showing an optical modulator having a package structure.

FIG. 10 is a cross-sectional view showing the optical modulator 12 having a package structure.

The optical modulator 12 shown in FIG. 10 includes a container 70 which is a housing, the optical modulation resonator 120 housed in the container 70, and a circuit element 45 constituting the oscillation circuit 54. The container 70 is hermetically sealed in a reduced pressure atmosphere such as vacuum or an inert gas atmosphere such as nitrogen or argon, for example.

As shown in FIG. 10, the container 70 has a container body 72 and a lid 74. Of these, the container body 72 has a first recess 721 provided inside the container body 72, and a second recess 722 provided inside the first recess 721 and deeper than the first recess 721. The container body 72 is made of, for example, a ceramic material, a resin material, or the like. Further, although not shown, the container body 72 includes an internal terminal provided on the inner surface, an external terminal provided on the outer surface, wiring for coupling the internal terminal and the external terminal, and the like.

Further, the opening of the container body 72 is closed with the lid 74 via a sealing member such as a seal ring or low melting point glass (not shown). As the constituent material of the lid 74, a material capable of transmitting laser light, for example, a glass material or the like is used.

The optical modulation resonator 120 is arranged on the bottom surface of the first recess 721. The optical modulation resonator 120 is supported on the bottom surface of the first recess 721 by a joining member (not shown). Further, the internal terminal of the container body 72 and the optical modulation resonator 120 are electrically coupled via a conductive material (not shown) such as a bonding wire or a bonding metal.

The circuit element 45 is arranged on the bottom surface of the second recess 722. The circuit element 45 is electrically coupled to the internal terminal of the container body 72 via a bonding wire 76. Accordingly, the optical modulation resonator 120 and the circuit element 45 are also electrically coupled via the wiring provided in the container body 72. The circuit element 45 may be provided with a circuit other than the oscillation circuit 54 described later.

As described above, the optical modulator 12 according to the present embodiment includes the container 70 which is a housing that houses the vibrator 30. The oscillation circuit 54 is also housed in the container 70.

By adopting such a package structure, the optical modulation resonator 120 and the circuit element 45 can be overlapped with each other, so that the physical distance between the two can be reduced, and the wiring length between the optical modulation resonator 120 and the circuit element 45 can be shortened. Therefore, it is possible to suppress external noise from entering the drive signal S1 and conversely, the drive signal S1 from becoming a noise source. Further, in one container 70, both the optical modulation resonator 120 and the circuit element 45 can be protected from the external environment. Therefore, the reliability of the laser interferometer 1 can be improved while reducing the size of the sensor head section 51.

The structure of the container 70 is not limited to the structure shown in the drawing, and for example, the optical modulation resonator 120 and the circuit element 45 may have separate package structures. Further, although not shown, other circuit elements constituting the oscillation circuit 54 may be housed in the container 70. The container 70 may be provided as needed and may be omitted.

2. Oscillation Circuit

As shown in FIGS. 1 and 2, the oscillation circuit 54 outputs the drive signal S1 input to the optical modulator 12 of the optical system 50. Further, the oscillation circuit 54 outputs the reference signal S2 input to the demodulation circuit 52.

The oscillation circuit 54 is not particularly limited as long as it is a circuit capable of oscillating the vibrator 30, and circuits having various configurations are used. As an example, FIG. 11 is a circuit diagram showing a configuration of a one-stage inverter oscillation circuit.

Figure 11:
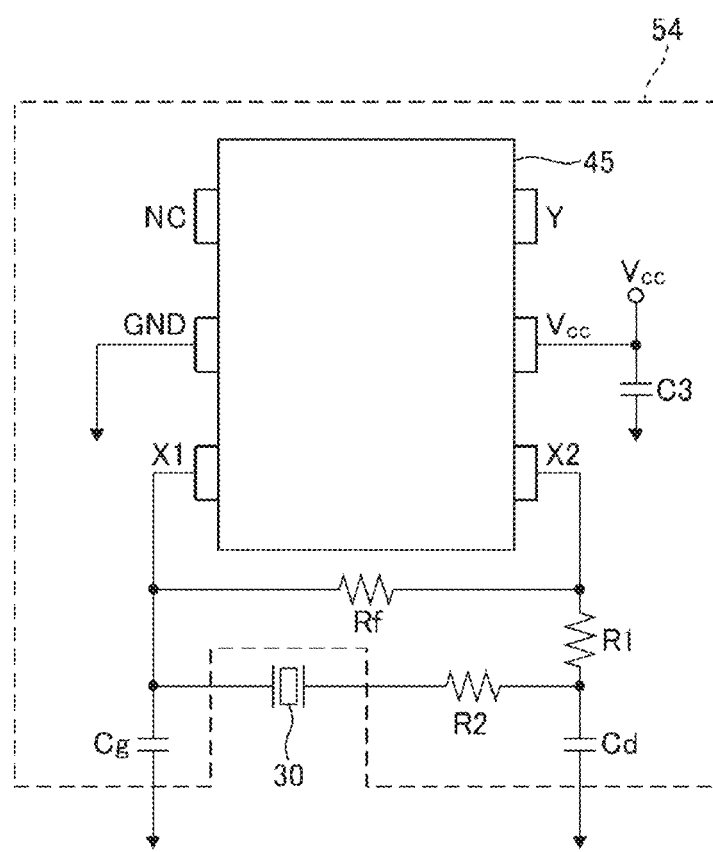
FIG. 11 is a circuit diagram showing a configuration of a one-stage inverter oscillation circuit.

The oscillation circuit 54 shown in FIG. 11 includes the circuit element 45, a feedback resistor Rf, a first limiting resistor R1, a second limiting resistor R2, a first capacitor Cg, a second capacitor Cd, and a third capacitor C3.

The circuit element 45 is an inverter IC. Terminals X1 and X2 of the circuit element 45 are terminals coupled to the inverter, respectively. A terminal GND is coupled to the ground potential and a terminal Vcc is coupled to the power potential. A terminal Y is a terminal for oscillation output.

The first capacitor Cg is coupled between the terminal X1 and the ground potential. Further, between the terminal X2 and the ground potential, the first limiting resistor R1 and the second capacitor Cd coupled in series with each other are coupled in this order from the terminal X2 side. Further, one end of the feedback resistor Rf is coupled between the terminal X1 and the first capacitor Cg, and the other end of the feedback resistor Rf is coupled between the terminal X2 and the first limiting resistor R1.

Further, one end of the second limiting resistor R2 is coupled between the first limiting resistor R1 and the second capacitor Cd. Further, the above-mentioned vibrator 30 is coupled between the first capacitor Cg and the feedback resistor Rf and the other end of the second limiting resistor R2. That is, the vibrator 30 serves as a signal source of the oscillation circuit 54.

Figure 12:
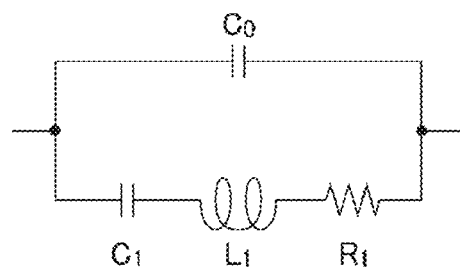
FIG. 12 is an example of an LCR equivalent circuit of a vibrator.

Further, FIG. 12 is an example of an LCR equivalent circuit of the vibrator 30.

As shown in FIG. 12, the LCR equivalent circuit of the vibrator 30 is composed of a series capacitance $C_1$, a series inductance $L_1$, an equivalent series resistance $R_1$, and a parallel capacitance $C_0$.

In such an oscillation circuit 54, when the capacitance of the first capacitor Cg is $C_g$ and the capacitance of the second capacitor Cd is $C_d$, a load capacitance $C_L$ is given by the following equation (a).

$$C_L = \frac{C_d C_g}{C_d + C_g} \quad (a)$$

Then, an oscillation frequency $f_{osc}$ output from the terminal Y of the oscillation circuit 54 is given by the following equation (b).

$$f_{osc} = f_Q \sqrt{1 + \frac{C_1}{C_0 + C_L}} \quad (b)$$

$f_Q$ is the natural frequency of the vibrator 30.

According to the above equation (b), it can be seen that the oscillation frequency $f_{osc}$ of the signal output from the terminal Y can be finely adjusted by appropriately changing the load capacitance $C_L$.

Further, a difference $\Delta f$ between the natural frequency $f_Q$ of the vibrator 30 and the oscillation frequency $f_{osc}$ of the oscillation circuit 54 is given by the following equation (c).

$$\Delta f = f_{osc} - f_Q = f_Q \left( \sqrt{1 + \frac{C_1}{C_0 + C_L}} - 1 \right) \quad (c)$$

Here, since $C_1 \ll C_0$ and $C_1 \ll C_L$, $\Delta f$ is approximately given by the following equation (d).

$$\Delta f = f_{osc} - f_Q \cong \frac{C_1}{2(C_0 + C_L)} f_Q \quad (d)$$

Therefore, the oscillation frequency $f_{osc}$ of the oscillation circuit 54 becomes a value corresponding to the natural frequency $f_Q$ of the vibrator 30.

When the vibrator 30 is fixed to, for example, the container 70, the natural frequency $f_Q$ fluctuates when it receives expansion stress due to temperature through the fixed portion. Further, when the vibrator 30 is tilted, the natural frequency $f_Q$ fluctuates due to the influence of the gravity effect of its own weight.

In the oscillation circuit 54, even if the natural frequency $f_Q$ fluctuates for this reason, the oscillation frequency $f_{osc}$ changes in conjunction with the fluctuation based on the above equation (d). That is, the oscillation frequency $f_{osc}$ is always a value deviated from the natural frequency $f_Q$ by $\Delta f$. Accordingly, the vibrator 30 can stably obtain a displacement amplitude $L_0$. This displacement amplitude $L_0$, which will be described later as a B value, is an important parameter in the optical modulation by the optical modulator 12. Therefore, if the displacement amplitude $L_0$ can be stabilized, the modulation characteristics of the optical modulator 12 can be stabilized, and the demodulation accuracy of the sample signal in the demodulation circuit 52 can be improved.

As an example, $\Delta f = f_{osc} - f_Q \leq 600$ [Hz] is preferable, and 240 [Hz] $\leq \Delta f \leq$ 450 [Hz] is more preferable. In this case, since the displacement amplitudes $L_0$ and the B value are particularly high, the modulation characteristics of the optical modulator 12 can be particularly stabilized.

When a signal generating device such as a function generator or a signal generator is used instead of the oscillation circuit 54, the oscillation frequency $f_{osc}$ cannot be linked to the fluctuation of the natural frequency $f_Q$ as described above, so that the displacement amplitude $L_0$ may become unstable.

As described above, the laser interferometer 1 according to the present embodiment includes the light source 2, the optical modulator 12, the photodetector 10, the demodulation circuit 52, and the oscillation circuit 54. The light source 2 emits the emission light L1 (first laser light). The optical modulator 12 includes the vibrator 30, and modulates the emission light L1 using the vibrator 30 to generate the reference light L2 (second laser light) including a modulated signal. The photodetector 10 receives interference light between the object light L3 (third laser light) including a signal, which is derived from the object 14 to be measured (object), generated by reflecting the emission light L1 on the object 14 to be measured and the reference light L2 to output a light reception signal. The demodulation circuit 52 demodulates the signal derived from the object 14 to be measured from the light reception signal based on the reference signal S2. The oscillation circuit 54 outputs the reference signal S2 input to the demodulation circuit 52. The vibrator 30 serves as a signal source for the oscillation circuit 54.

Here, the configuration of a laser interferometer in the related art and the configuration of the laser interferometer 1 according to the present embodiment are compared.

Figure 13:
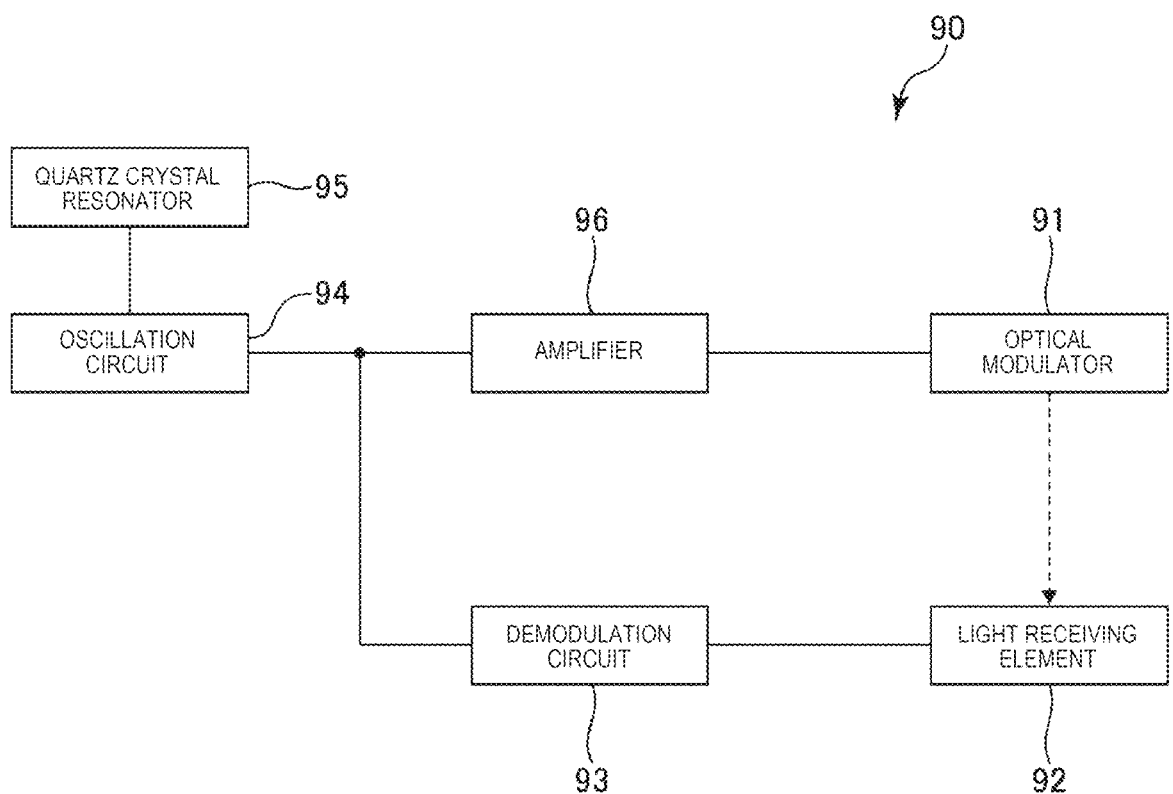
FIG. 13 is a diagram showing a simplified configuration of a laser interferometer in the related art.
Figure 14:
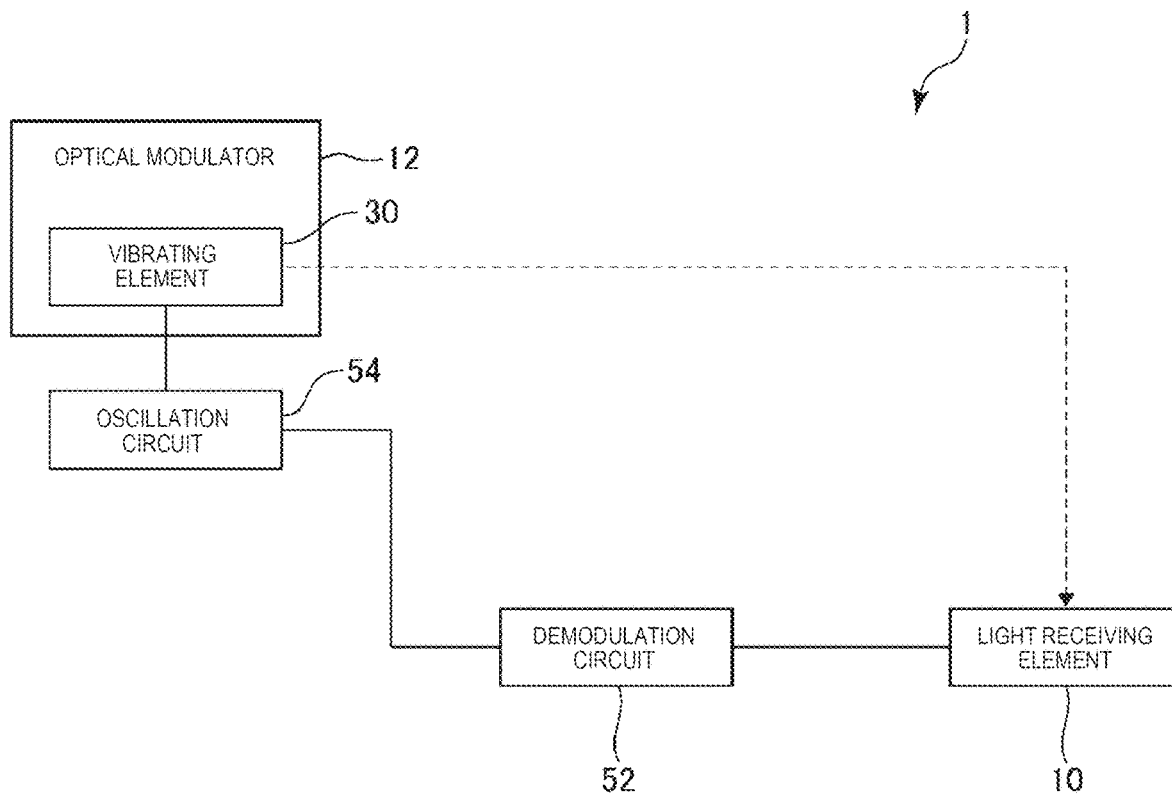
FIG. 14 is a diagram showing a simplified configuration of the laser interferometer of FIG. 1.

FIG. 13 is a diagram showing a simplified configuration of a laser interferometer 90 in the related art. FIG. 14 is a diagram showing a simplified configuration of the laser interferometer 1 of FIG. 1.

The laser interferometer 90 in the related art shown in FIG. 13 includes an optical modulator 91 such as an acousto-optic modulator (AOM) and an electro-optical modulator (EOM), a photodetector 92, a demodulation circuit 93, an oscillation circuit 94, a quartz crystal resonator 95, and an amplifier 96. The oscillation circuit 94 generates a drive signal by making the quartz crystal resonator 95 oscillate. Then, the drive signal amplified by the amplifier 96 is input to the optical modulator 91 to operate the optical modulator 91. Further, the oscillation circuit 94 outputs a reference signal necessary for demodulating the sample signal in the demodulation circuit 93.

In the laser interferometer 90 in the related art, a deviation in temperature characteristics may occur between the optical modulator 91, which is responsible for optical modulation, and the quartz crystal resonator 95. Therefore, there is a problem that the deviation in temperature characteristics lowers the measurement accuracy of the laser interferometer 90.

On the other hand, the laser interferometer 1 according to the present embodiment shown in FIG. 14 includes the optical modulator 12 including the vibrator 30, the photodetector 10, the demodulation circuit 52, and the oscillation circuit 54. The oscillation circuit 54 operates the optical modulator 12 by making the vibrator 30 oscillate. Further, the oscillation circuit 54 outputs a reference signal S2 necessary for demodulating the sample signal in the demodulation circuit 52 using the vibrator 30 as a signal source.

Therefore, according to the configuration of the present embodiment, since the vibrator 30 is responsible for the optical modulation in the optical modulator 12, the temperature characteristic of the modulated signal corresponds to the temperature characteristic of the vibrator 30. On the other hand, since the vibrator 30 serves as the signal source of the oscillation circuit 54, the temperature characteristic of the reference signal S2 output from the oscillation circuit 54 to the demodulation circuit 52 also corresponds to the temperature characteristic of the vibrator 30. Then, both the temperature characteristic of the modulated signal and the temperature characteristic of the reference signal correspond to the temperature characteristic of the vibrator 30, so that the behavior of the fluctuation of the modulated signal due to the temperature change and the behavior of the fluctuation of the reference signal match or approximate. Therefore, even if the temperature of the vibrator 30 changes, the influence on the demodulation accuracy can be suppressed, and the demodulation accuracy of a sample signal derived from the object 14 to be measured can be improved.

Further, in the optical modulator 91 in the related art, it is necessary to maintain the temperature of the optical modulator 91, and it is difficult to reduce the volume. Further, since the power consumption of the optical modulator 91 is large, there is a problem that it is difficult to reduce the size and power consumption of the laser interferometer 90.

On the other hand, in the present embodiment, since the volume of the vibrator 30 is very small and the electric power required for oscillation is also small, it is easy to reduce the size and power consumption of the laser interferometer 1.

Further, as described above, the vibrator 30 modulates the emission light L1 (first laser light) into the reference light L2 (second laser light) by vibration. Then, the oscillation circuit 54 generates the reference signal S2 based on a signal derived from the vibration of the vibrator 30 as the signal source.

According to such a configuration, the vibration of the vibrator 30 contributes to both the modulation of the emission light L1 and the generation of the reference signal S2. Therefore, the vibration frequency of the vibrator 30 directly affects both the modulation frequency of the emission light L1 and the frequency of the reference signal S2. Therefore, even if the modulation frequency deviates due to the temperature change of the vibrator 30, the reference signal S2 also deviates, and thus the temperature change is less likely to affect the calculation by a multiplier 538 of a preprocessing section 53 and the calculation by a first multiplier 551 and a second multiplier 552 of a demodulation section 55, which will be described later. Therefore, in principle, environmental changes such as temperature changes are less likely to affect the calculation process, so that a decrease in demodulation accuracy can be particularly suppressed.

3. Demodulation Circuit

The demodulation circuit 52 performs a demodulation process for demodulating a sample signal derived from the object 14 to be measured from the light reception signal output from the photodetector 10. The sample signal is, for example, a phase signal or a frequency signal. Displacement information of the object 14 to be measured can be acquired from the phase signal. Further, velocity information of the object 14 to be measured can be acquired from the frequency signal. If different information can be acquired in this way, the function as a displacement meter or a velocimeter can be provided, so that the laser interferometer 1 can be enhanced in functionality.

The circuit configuration of the demodulation circuit 52 is set according to the modulation processing method. In the laser interferometer 1 according to the present embodiment, the optical modulator 12 including the vibrator 30 is used. Since the vibrator 30 is a simple vibrator, the vibration velocity changes from moment to moment. Therefore, the modulation frequency also changes, and the demodulation circuit in the related art cannot be used as it is.

The demodulation circuit in the related art refers to a circuit that demodulates a sample signal from a light reception signal including a modulated signal modulated by using an acousto-optic modulator (AOM). In the acousto-optic modulator, the modulation frequency does not change. Therefore, the demodulation circuit in the related art can demodulate the sample signal from the light reception signal including a modulated signal modulated by the optical modulator whose modulation frequency does not change. However, when a modulated signal modulated by the optical modulator 12 whose modulation frequency changes is included, the modulated signal cannot be demodulated as it is.

Therefore, the demodulation circuit 52 shown in FIG. 1 includes the preprocessing section 53 and the demodulation section 55. The light reception signal output from the photodetector 10 is first passed through the preprocessing section 53 and then guided to the demodulation section 55. The preprocessing section 53 preprocesses the light reception signal. By this preprocessing, a signal that can be demodulated by the demodulation circuit in the related art can be obtained. Therefore, in the demodulation section 55, the sample signal derived from the object 14 to be measured is demodulated by a known demodulation method.

3.1. Configuration of Preprocessing Section

The preprocessing section 53 shown in FIG. 1 includes a first bandpass filter 534, a second bandpass filter 535, a first delay adjuster 536, a second delay adjuster 537, a multiplier 538, a third bandpass filter 539, a first AGC 540, a second AGC 541, and a summer 542. AGC stands for an Auto Gain Control.

Further, a current-voltage converter 531 and an ADC 532 are coupled in this order from the photodetector 10 side between the preprocessing section 53 and the photodetector 10.

Further, an ADC 533 is coupled between the oscillation circuit 54 and the second delay adjuster 537.

The current-voltage converter 531 is a transimpedance amplifier, which converts a current output from the photodetector 10 into a voltage signal. The ADCs 532 and 533 are analog-to-digital converters, which convert an analog signal into a digital signal with a predetermined number of sampling bits.

The first bandpass filter 534, the second bandpass filter 535, and the third bandpass filter 539 are filters that selectively transmit signals in a specific frequency band.

The first delay adjuster 536 and the second delay adjuster 537 are circuits that adjust the signal delay. The multiplier 538 is a circuit that generates an output signal proportional to the product of two input signals. The first AGC 540 and the second AGC 541 are circuits that align the amplitudes of signals with each other. The summer 542 is a circuit that generates an output signal proportional to the sum of two input signals.

The current output which is output from the photodetector 10 is converted into a voltage signal by the current-voltage converter 531. The voltage signal is converted into a digital signal by the ADC 532 and divided into a first signal and a second signal.

After the first signal is passed through the first bandpass filter 534, a group delay is adjusted by the first delay adjuster 536. The group delay adjusted by the first delay adjuster 536 corresponds to a group delay of the second signal by the second bandpass filter 535, which will be described later. Due to this delay adjustment, the delay time associated with the passage of the filter circuit can be made uniform between the first bandpass filter 534 through which the first signal passes and the second bandpass filter 535 and the third bandpass filter 539 through which the second signal passes. The first signal that has passed through the first delay adjuster 536 is input to the summer 542 via the first AGC 540.

The second signal is passed through the second bandpass filter 535 and then input to the multiplier 538. In the multiplier 538, a reference signal $\cos(\omega_m t)$ output from the second delay adjuster 537 is multiplied by the second signal. Specifically, the reference signal S2 output from the oscillation circuit 54 is digitally converted by the ADC 533, the phase is adjusted by the second delay adjuster 537, and the signal is output to the multiplier 538. After that, the second signal is passed through the third bandpass filter 539 and then input to the summer 542 via the second AGC 541. In the summer 542, an output signal proportional to the sum of the first signal and the second signal is output to the demodulation section 55.

3.2. Principle of Preprocessing by Preprocessing Section

Next, the principle of preprocessing in the preprocessing section 53 will be described. First, when $$E_m = a_m \cos\{2\pi(f_0 t + \int f_m(t)dt) + \phi_{m0}\} \tag{1}$$

$$E_d = a_d \cos\{2\pi(f_0 t + \int f_d(t)dt) + \phi_{d0}\} \tag{2}$$

$$\phi_a = \phi_{m0} - \phi_{d0} \tag{3}$$

a light reception signal intensity $I_{PD}$ output from the photodetector 10 is theoretically represented by the following equation.

$$\begin{aligned}
I_{PD} &= \langle |E_m + E_D|^2 \rangle \\
&= \langle |E_m^2 + E_d^2 + 2E_m E_d| \rangle \\
&= \Big\langle a_m^2 \cos^2 2\pi\Big(f_0 t + \int f_m(t)dt + \phi_{m0}\Big) + a_d^2 \cos^2 2\pi\Big(f_0 t + \int f_d(t)dt + \phi_{d0}\Big) + \\
&\quad 2a_m a_d \cos 2\pi\Big(f_0 t + \int f_m(t)dt + \phi_{m0}\Big) \cdot \cos 2\pi\Big(f_0 t + \int f_d(t)dt + \phi_{d0}\Big) \Big\rangle \\
&= \Big\langle a_m^2 \cos^2 2\pi\Big(f_0 t + \int f_m(t)dt + \phi_{m0}\Big) + a_d^2 \cos^2 2\pi\Big(f_0 t + \int f_d(t)dt + \phi_{d0}\Big) + \\
&\quad a_m a_d \Big\{ \cos 2\pi\Big(2f_0 t + \int (f_m(t) + f_d(t))dt + \phi_{m0} + \phi_{d0}\Big) + \\
&\quad \cos 2\pi\Big(\int (f_m(t) - f_d(t))dt + \phi_0\Big)\Big\}\Big\rangle \\
&= \frac{a_m^2 + a_d^2}{2} + a_m a_d \Big\{\cos 2\pi\Big(\int (f_m(t) - f_d(t))dt + \phi_0\Big)\Big\}
\end{aligned} \tag{4}$$

$E_m$, $E_d$, $\varphi_{m0}$, $\varphi_{d0}$, $\varphi_0$, $f_m(t)$, $f_d(t)$, $f_0$, $a_m$, and $a_d$ are as follows.

$E_m$: Electric field component of modulated signal
$E_d$: Electric field component of sample signal derived from object to be measured
$\varphi_{m0}$: Initial phase value of optical path 20
$\varphi_{d0}$: Initial phase value of optical path 22
$\varphi_0$: Optical path phase difference of laser interferometer
$f_m(t)$: Frequency of modulated signal derived from optical modulator
$f_d(t)$: Frequency of sample signal derived from object to be measured
$f_0$: Frequency of emission light emitted from light source
$a_m$: Coefficient
$a_d$: Coefficient Further, < > in the equation (4) represents a time average. $f_0$ is about 300 THz as an example, $f_m(t)$ is about 100 kHz to 100 MHz as an example, and $f_d(t)$ is about 1 kHz to 10 MHz as an example.

The first term of the above equation (4) represents a DC component, and the second term represents an AC component. When this AC component is referred to as $I_{PD.AC}$, $I_{PD.AC}$ is as follows.

$$I_{PD.AC} = a_m a_d \Big\{\cos 2\pi\Big(\int (f_m(t) - f_d(t))dt + \phi_0\Big)\Big\} \tag{5}$$

-continued $$= a_m a_d \cos\left(\frac{f_{mdmax}}{f_m} \sin 2\pi f_m t + X(t)\right)$$

$$2\pi \int f_m(t) dt = \frac{f_{mdmax}}{f_m} \sin 2\pi f_m t \quad (6)$$

$$X(t) = -\int f_d(t) dt + \phi_0 \quad (7)$$

$f_{mdmx}$: Doppler shift of modulated signal derived from optical modulator $f_m$: Modulation frequency of optical modulator Further, $I_{PD\_AC}$ can be transformed as follows.

$$I_{PD,AC} = A \cos(B \sin 2\pi f_m t + X(t)) \quad (8)$$

$$= A(\cos B \sin 2\pi f_m t \cdot \cos X(t) - \sin B \sin 2\pi f_m t \cdot \sin X(t))$$

$$A = a_m a_d \quad (9)$$

$$B = \frac{f_{mdmax}}{f_m} \quad (10)$$

Here, a ν-order Bessel function as shown in the following equation is known.

$$\cos\{\zeta \sin(2\pi f_v t)\} = J_0(\zeta) + 2J_2(\zeta)\cos(2\cdot 2\pi f_v t) + 2J_4(\zeta)\cos(4\cdot 2\pi f_v t) + \ldots \quad (11)$$

$$\sin\{\zeta \sin(2\pi f_v t)\} = 2J_1(\zeta)\sin(1\cdot 2\pi f_v t) + 2J_3(\zeta)\sin(3\cdot 2\pi f_v t) + \ldots \quad (12)$$

When the above equation (8) is series-expanded using the Bessel functions of the above equations (11) and (12), equation (8) can be transformed as follows.

$$I_{PD,AC} = A[\{J_0(B) + 2J_2(B)\cos(2\cdot 2\pi f_m t) + 2J_4(B)\cos(4\cdot 2\pi f_m t) + \ldots\} \cos X(t) - \{2J_1(B)\sin(1\cdot 2\pi f_m t) + 2J_3(B)\sin(3\cdot 2\pi f_m t) + \ldots\} \sin X(t)] \quad (13)$$

However, $J_0(B)$, $J_1(B)$, $J_2(B)$, ... are Bessel coefficients, respectively.

The relationship between the order of the vibration frequency and the coefficient in each of the expanded terms is shown in Table 1 below.

TABLE 1

| Vibration frequency (angular frequency) | DC | $1 \cdot 2\pi f_m$ $(1 \cdot \omega_m)$ | $2 \cdot 2\pi f_m$ $(2 \cdot \omega_m)$ | $3 \cdot 2\pi f_m$ $(3 \cdot \omega_m)$ | $4 \cdot 2\pi f_m$ $(4 \cdot \omega_m)$ | $5 \cdot 2\pi f_m$ $(5 \cdot \omega_m)$ | $6 \cdot 2\pi f_m$ $(6 \cdot \omega_m)$ |
|---|---|---|---|---|---|---|---|
| Coefficient | $AJ_0(B)\cos X$ | $2AJ_1(B)\sin X$ | $2AJ_2(B)\cos X$ | $2AJ_3(B)\sin X$ | $2AJ_4(B)\cos X$ | $2AJ_5(B)\sin X$ | $2AJ_6(B)\cos X$ |

When expanded as described above, it can be said that theoretically, the band corresponding to a specific order can be extracted by a bandpass filter.

Therefore, the preprocessing section 53 described above preprocesses the light reception signal in the following flow based on this theory.

First, the digital signal output from the above-mentioned ADC 532 is divided into two, a first signal and a second signal. The first signal is passed through the first bandpass filter 534. The central angular frequency of the first bandpass filter 534 is set to $\omega_m$. Accordingly, the first signal after passing through the first bandpass filter 534 is represented by the following equation as a result of further adjusting the phase and amplitude with the first delay adjuster 536 and the first AGC 540.

$$I_{pass1} = C \sin(2\pi f_m t) \cdot \sin X(t) \quad (14)$$

On the other hand, the second signal is passed through the second bandpass filter 535. The central angular frequency of the second bandpass filter 535 is set to a value different from the central angular frequency of the first bandpass filter 534. Here, as an example, the central angular frequency of the second bandpass filter 535 is set to $2\omega_m$. Accordingly, the second signal after passing through the second bandpass filter 535 is represented by the following equation.

$$I_{BPF2} = 2J_2(B)\cos(2\cdot 2\pi f_m t) \cdot \cos X(t) = J_2(B)\{\cos(2\cdot 2\pi f_m t + X(t)) + \cos(2\cdot 2\pi f_m t - X(t))\} \quad (15)$$

The second signal after passing through the second bandpass filter 535 is multiplied by the reference signal $\cos(\omega_m t)$ by the multiplier 538. The second signal after multiplication is represented by the following equation.

$$I_{\cos(\omega_m t)} = J_2(B)\{\cos(2\cdot 2\pi f_m t + X(t)) + \cos(2\cdot 2\pi f_m t - X(t))\} \cdot \cos(2\pi f_m t) = J_2(B)\{\cos(3\cdot 2\pi f_m t + X(t)) + \cos(1\cdot 2\pi f_m t + X(t)) + \cos(3\cdot 2\pi f_m t - X(t)) + \cos(1\cdot 2\pi f_m t - X(t))\} \quad (16)$$

The second signal after passing through the multiplier 538 is passed through the third bandpass filter 539. The central angular frequency of the third bandpass filter 539 is set to the same value as the central angular frequency of the first bandpass filter 534. Here, as an example, the central angular frequency of the third bandpass filter 539 is set to $\omega_m$. Accordingly, the second signal after passing through the third bandpass filter 539 is represented by the following equation.

$$I_{BPF3} = J_2(B)\{\cos(2\pi f_m t + X(t)) + \cos(2\pi f_m t - X(t))\} = 2J_2(B)\cos(2\pi f_m t) \cdot \cos X(t) \quad (17)$$

The second signal after passing through the third bandpass filter 539 is represented by the following equation as a result of having the same amplitude as the first signal by the second AGC 541.

$$I_{pass2} = C \cos(2\pi f_m t) \cdot \cos X(t) \quad (18)$$

The first signal represented by the above equation (14) and the second signal represented by the above equation (18) are summed by the summer 542. The summing result is represented by the following equation.

$$I_{53} = \cos(2\pi f_m t - X(t)) \quad (19)$$

As a result of the summation, the unnecessary term disappears and the necessary term can be taken out as in the above equation (19). This result is output to the demodulation section 55. Although the preprocessing section 53 has been described in the digital processing using the ADC, the preprocessing section 53 may have an analog circuit configuration without the ADC.

3.3. Configuration of Demodulation Section

The demodulation section 55 performs a demodulation process for demodulating a sample signal derived from the object 14 to be measured from the signal output from the preprocessing section 53. The demodulation process is not particularly limited, and examples thereof include a known orthogonal detection method. The orthogonal detection method is a method of performing the demodulation process by performing an operation of mixing signals orthogonal to each other from the outside with respect to an input signal.

The demodulation section 55 shown in FIG. 1 is a digital circuit including a first multiplier 551, a second multiplier 552, a phase shifter 553, a first low-pass filter 555, a second low-pass filter 556, a divider 557, an inverse tangent calculator 558, and a signal output circuit 559.

3.4. Principle of Demodulation Process by Demodulation Section

In the demodulation process, first, the signal output from the preprocessing section 53 is divided into two. The first multiplier 551 multiplies one of the divided signals by a frequency signal $\cos(\omega_m t)$, which is the reference signal S2 output from the oscillation circuit 54. The second multiplier 552 multiplies the other of the divided signals by a frequency signal $-\sin(\omega_m t)$ obtained by shifting the phase of the reference signal S2 output from the oscillation circuit 54 by $-90°$ by the phase shifter 553. The frequency signal $\cos(\omega_m t)$ and the frequency signal $-\sin(\omega_m t)$ are signals that are 90° out of phase with each other.

The signal passed through the first multiplier 551 is passed through the first low-pass filter 555 and then input to the divider 557 as a signal x. The signal passed through the second multiplier 552 is also passed through the second low-pass filter 556, and then input to the divider 557 as a signal y. The divider 557 divides the signal y by the signal x, passes the signal y/x through the inverse tangent calculator 558, and obtains a signal a $\tan(y/x)$.

After that, by passing the signal a $\tan(y/x)$ through the signal output circuit 559, a phase $\varphi_d$ is obtained as the sample signal derived from the object 14 to be measured. Then, the displacement information of the object 14 to be measured can be calculated based on the phase $\varphi_d$. Thereby, a displacement meter that measures the displacement of the object 14 to be measured is realized. In addition, velocity information can be obtained from the displacement information. Thereby, a velocimeter that measures the velocity of the object 14 to be measured is realized.

Although the circuit configuration of the demodulation section 55 has been described above, the circuit configuration of the above digital circuit is an example and is not limited thereto. Further, the demodulation section 55 is not limited to a digital circuit, and may be an analog circuit. The analog circuit may include an F/V converter circuit and a $\Delta\Sigma$ counter circuit.

Further, in the circuit configuration of the demodulation section 55 described above, a frequency signal may be obtained as a sample signal derived from the object 14 to be measured. The velocity information of the object 14 to be measured can be calculated based on the frequency signal.

4. Phase Amplitude

As can be seen from the principle of preprocessing by the preprocessing section 53 described above, in order to perform the preprocessing stably, both the signal component of $1 \cdot \omega_m$ and the signal component of $2 \cdot \omega_m$ shown in Table 1 described above are required among the AC components of the light reception signal.

Figure 15:
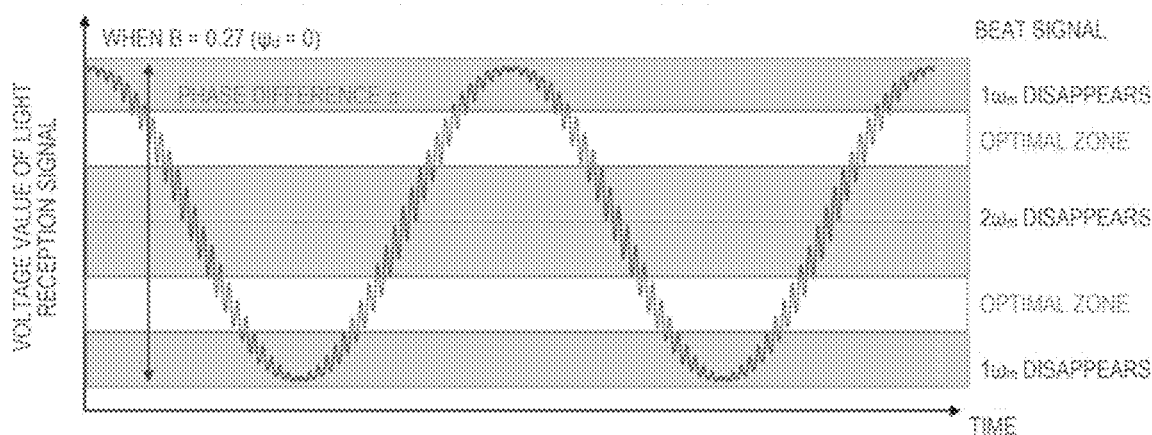
FIG. 15 is a graph showing an example of a waveform of a light reception signal.

FIG. 15 is a graph showing an example of a waveform of a light reception signal. As described above, the light reception signal is divided into a DC component and an AC component. In FIG. 15, in order to reproduce various states where an optical path phase difference $\varphi_0$ of the laser interferometer 1 can be taken, $\varphi_0$ is given a gentle periodic fluctuation. Therefore, in FIG. 15, the DC component $\cos(\varphi_0)$ corresponds to a long wave period, and the AC component $\cos(\psi_m - \psi_d + \varphi_0)$ corresponds to a short wave period. $\psi_m$ is the phase of the modulated signal by the optical modulator 12, and is represented by $\psi_m = B \sin(\omega_m t)$. $\psi_d$ is the phase of the sample signal derived from the object 14 to be measured. In FIG. 15, $\psi_d = 0$. Further, as an example, $B = 0.27$.

The long wave period and the short wave period will vary depending on the measurement conditions. Therefore, in order to perform stable measurement of the object 14 to be measured in any movement, it is required that the line representing the light reception signal falls within the two regions described as an "optimal zone" in FIG. 15. The optimal zone is a region in which both the signal component of $1 \cdot \omega_m$ and the signal component of $2 \cdot \omega_m$ described above appear in the AC component of the light reception signal. That is, when the waveform is out of the optimal zone, as shown in FIG. 15, the signal component of $1 \cdot \omega_m$ disappears or the signal component of $2 \cdot \omega_m$ disappears.

Therefore, in order to enter the above-mentioned "optimal zone", it is sufficient that the amplitude of $\psi_m + \varphi_0$ among the AC components is larger than $\pi/3$. Further, it is preferably larger than $\pi/2$.

Based on this, when the change amplitude of the phase $\psi_m$ of the modulated signal is $\Delta\psi_m$ and the change amplitude of the phase $\psi_d$ of the sample signal is $\Delta\psi_d$, it is sufficient that at least $\Delta\psi_m + \Delta\psi_d > \pi/3$ holds. Then, it is preferable that $\Delta\psi_m$ is as large as possible toward $\pi/3$. This enables stable measurement.

From the above equation of $\psi_m = B \sin(\omega_m t)$, the change amplitude $\Delta\psi_m$ of the phase $\psi_m$ of the modulated signal becomes a value of B. Therefore, when selecting the vibrator 30, it is preferable that the B value is as large as possible toward $\pi/3$. As an example, the B value is preferably more than 0.5, more preferably more than $\pi/3$. As a result, even if the displacement of the object 14 to be measured is smaller, stable measurement can be performed.

Further, the B value can be converted into the displacement amplitude $L_0$ of the vibrator 30. For example, when the wavelength of the emission light L1 is 632 nm, it is sufficient that $L_0 > 69.5$ nm in order to satisfy $B > \pi/3$. Further, when the wavelength of the emission light L1 is 850 nm, it is sufficient that $L_0 > 93.4$ nm in order to satisfy $B > \pi/3$. Therefore, when selecting the vibrator 30, the selection may be performed with the displacement amplitude $L_0$ as a guide.

These numerical values are obtained as follows.

From the above equation (10), $B = f_{mdmax}/f_m$. Further, $f_{mdmax} = (4\pi \cdot f_m \cdot L_0 \cdot \sin\theta)/\lambda$. $\lambda$ is the wavelength of the emission light L1 and $\theta$ is the inclination angle shown in FIG. 8.

Thereby, $(4\pi L_0 \sin\theta)/\lambda > \pi/3$ holds. As a result, $L_0 > \lambda/(12 \sin\theta)$. Therefore, for example, if $\theta = 49.3°$, when $\lambda = 632$ nm described above, $L_0 > 69.5$ nm [$= 632/\{12 \times \sin(49.3)\}$]. Further, when $\lambda = 850$ nm, $L_0 > 93.4$ nm [$= 850/\{12 \times \sin(49.3)\}$].

Figure 16:
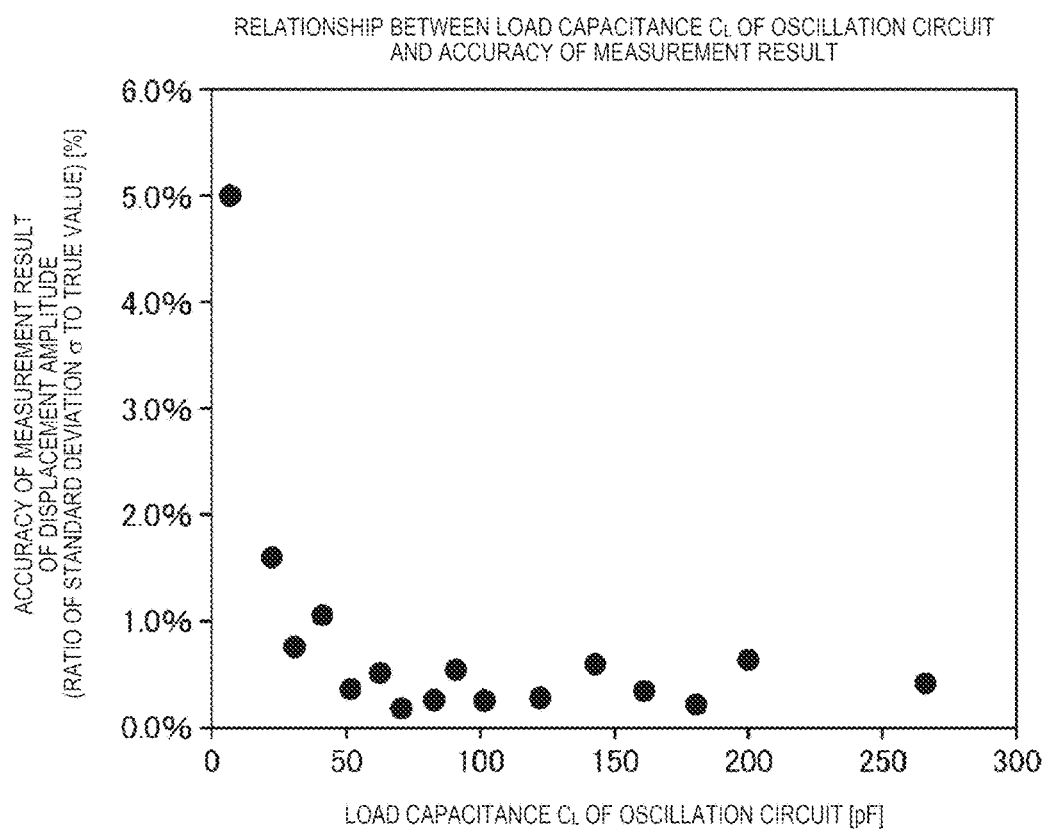
FIG. 16 is a graph showing a relationship between a load capacitance of an oscillation circuit and an accuracy of a measurement result of a displacement amplitude with respect to a piezo element as an object to be measured.

FIG. 16 is a graph showing a relationship between a load capacitance $C_L$ of the oscillation circuit 54 and an accuracy of a measurement result of a displacement amplitude with respect to a piezo element as the object 14 to be measured. The vertical axis of FIG. 16 represents the ratio of the standard deviation $\sigma$ of the measurement result to the true value of 80.3 nm when the displacement amplitude of the piezo element is measured by the laser interferometer 1. Hereinafter, this value is referred to as the "demodulation accuracy".

In FIG. 16, it is recognized that the demodulation accuracy of 1% or less is realized by setting the load capacitance $C_L$ of the oscillation circuit 54 to a predetermined value or more. In the example of FIG. 16, the demodulation accuracy of 1% or less can be realized by setting the load capacitance $C_L$ to 50 pF or more. When the natural frequency $f_Q$ of the vibrator 30 is 4,971,886 Hz, if the threshold value of the load capacitance $C_L$ of 50 pF or more is converted into Δf based on the above equation (d), Δf≤600 [Hz]. Therefore, by satisfying this condition, good demodulation accuracy can be realized in the laser interferometer 1.

5. Modification Example

Next, laser interferometers according to modification examples will be described.

Figure 17:
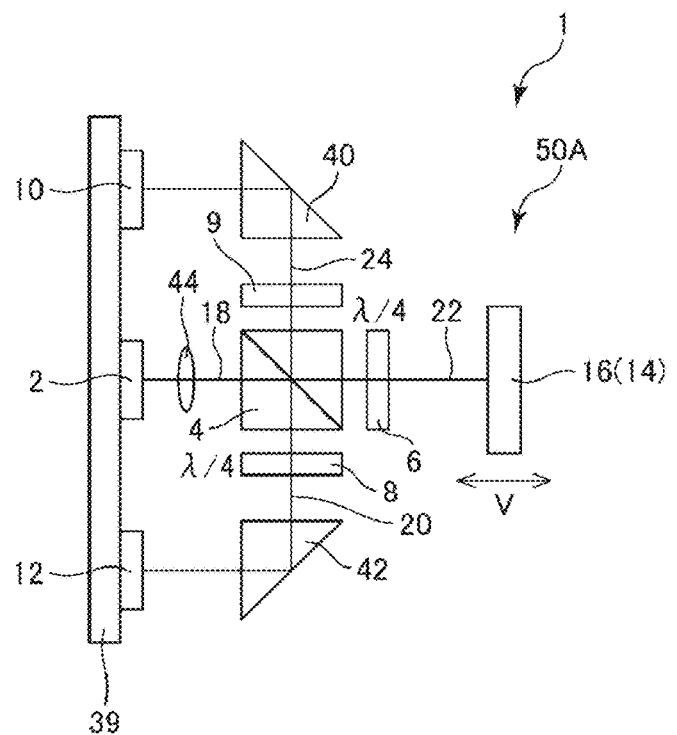
FIG. 17 is a schematic configuration diagram showing a mounting structure of an optical system included in a laser interferometer according to a first modification example.
Figure 18:
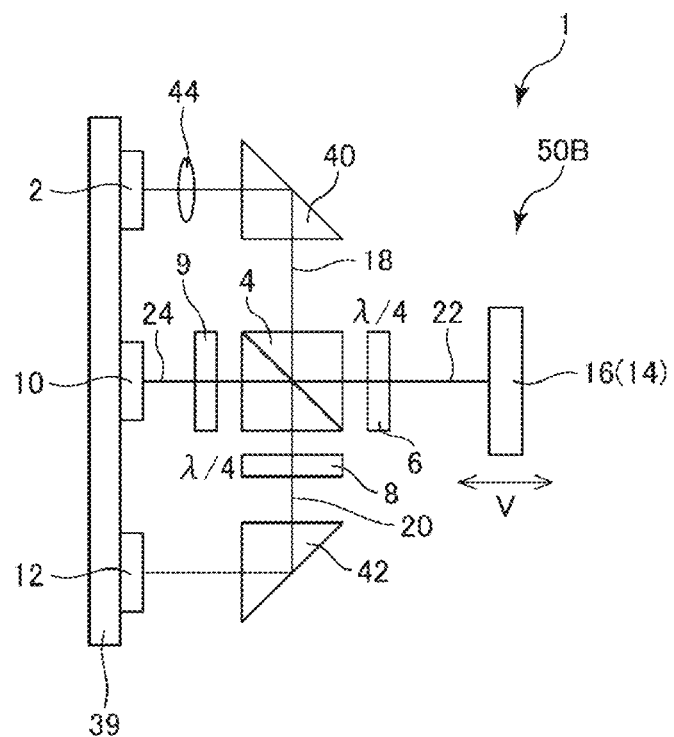
FIG. 18 is a schematic configuration diagram showing a mounting structure of an optical system included in a laser interferometer according to a second modification example.
Figure 19:
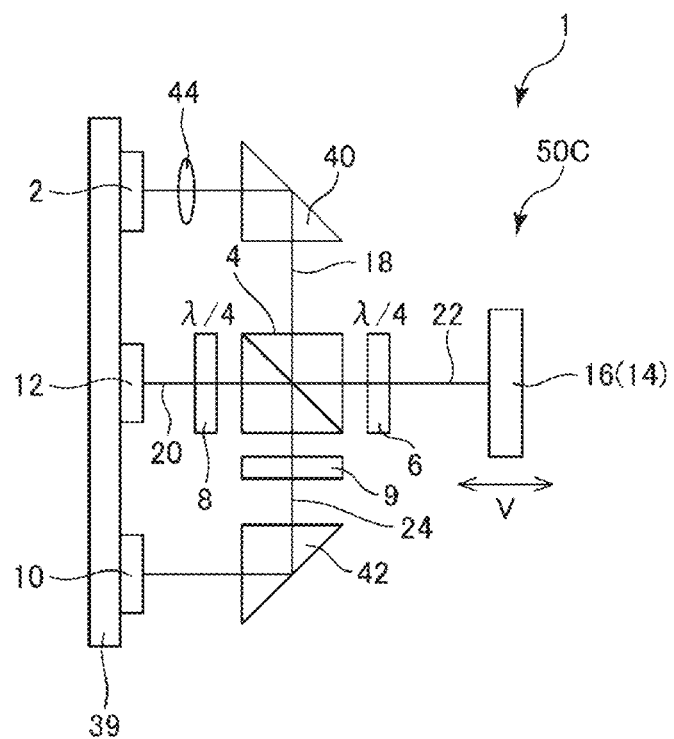
FIG. 19 is a schematic configuration diagram showing a mounting structure of an optical system included in a laser interferometer according to a third modification example.
Figure 20:
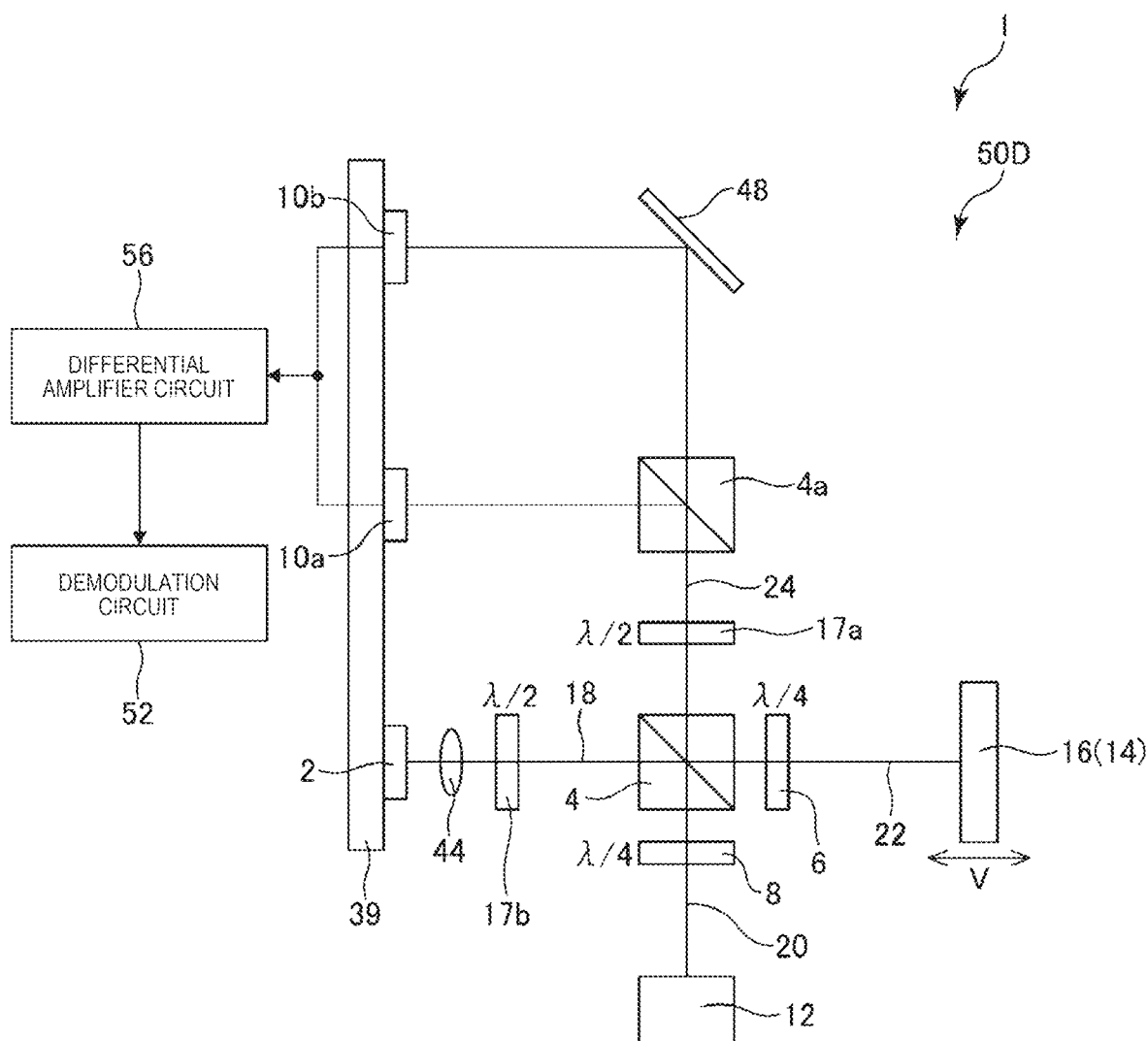
FIG. 20 is a schematic configuration diagram showing a mounting structure of an optical system included in a laser interferometer according to a fourth modification example.

FIG. 17 is a schematic configuration diagram showing a mounting structure of an optical system included in a laser interferometer according to a first modification example. FIG. 18 is a schematic configuration diagram showing a mounting structure of an optical system included in a laser interferometer according to a second modification example. FIG. 19 is a schematic configuration diagram showing amounting structure of an optical system included in a laser interferometer according to a third modification example. FIG. 20 is a schematic configuration diagram showing amounting structure of an optical system included in a laser interferometer according to a fourth modification example.

Hereinafter, modification examples will be described, but in the following description, the differences from the above-described embodiment will be mainly described, and the description of the same matters will be omitted. In addition, in FIGS. 17 to 20, the same reference numerals are given to the same configurations as those of the above-described embodiment.

An optical system 50A of a laser interferometer 1 shown in FIG. 17 includes a substrate 39. A light source 2, an optical modulator 12, and a photodetector 10 are each mounted on the substrate 39. On the substrate 39, the photodetector 10, the light source 2, and the optical modulator 12 are arranged in this order in the direction orthogonal to an optical path 22 shown in FIG. 17.

Further, the optical system 50A shown in FIG. 17 includes prisms 40 and 42. The prism 40 is provided on an optical path 24 between the photodetector 10 and an optical analyzer 9. The prism 42 is provided on an optical path 20 between the optical modulator 12 and a quarter wave plate 8.

Further, the optical system 50A shown in FIG. 17 includes a convex lens 44. The convex lens 44 is provided on an optical path 18 between the light source 2 and a polarization beam splitter 4. By providing the convex lens 44, emission light L1 emitted from the light source 2 can be focused and effectively used.

An optical system 50B of a laser interferometer 1 shown in FIG. 18 is the same as the optical system 50A shown in FIG. 17, except that the arrangement of the elements and the like is different.

On a substrate 39 shown in FIG. 18, a light source 2, a photodetector 10, and an optical modulator 12 are arranged in this order in the direction orthogonal to an optical path 22 shown in FIG. 18. A prism 40 is provided on an optical path 18, and a prism 42 is provided on an optical path 20.

An optical system 50C of a laser interferometer 1 shown in FIG. 19 has an arrangement in which an optical modulator 12 is incorporated in an optical path connecting an object 14 to be measured to a photodetector 10.

On a substrate 39 shown in FIG. 19, a light source 2, an optical modulator 12, and a photodetector 10 are arranged in this order in the direction orthogonal to an optical path 22 shown in FIG. 19. A prism 40 is provided on an optical path 18, and a prism 42 is provided on an optical path 24.

According to the mounting structures shown in FIGS. 17 to 19 as described above, the size of the laser interferometer 1 can be easily reduced. The arrangement of the elements is not limited to the arrangement shown in the drawings.

In the mounting structures shown in FIGS. 17 to 19, the size of the photodetector 10 is, for example, 0.1 mm square, the size of the light source 2, is, for example, 0.1 mm square, and the size of the optical modulator 12 is, for example, 0.5 to 10 mm square. The size of the substrate 39 on which these elements are mounted is, for example, 1 to 10 mm square. Thereby, the size of the laser interferometer 1 can be reduced to about the size of the substrate 39.

An optical system 50D of a laser interferometer 1 shown in FIG. 20 is the same as the optical system 50 of the above-described embodiment except that the following points are different.

First, the optical system 50D includes two photodetectors 10a and 10b instead of the photodetector 10 of the embodiment. Further, the optical system 50D includes a polarization beam splitter 4a in addition to a polarization beam splitter 4. The polarization beam splitter 4a transmits P-polarized light and reflects S-polarized light. Further, the optical system 50D includes half wave plates 17a and 17b, a convex lens 44, and a mirror 48. The optical system 50D includes a substrate 39 on which a light source 2 and the photodetectors 10a and 10b are mounted.

The half wave plate 17a, the polarization beam splitter 4a, and the mirror 48 are arranged in this order from the polarization beam splitter 4 side on an optical path 24 between the polarization beam splitter 4 and the photodetector 10b.

The half wave plate 17b and the convex lens 44 are arranged in this order from the polarization beam splitter 4 side on an optical path 18.

Further, the laser interferometer 1 shown in FIG. 20 includes a differential amplifier circuit 56 that performs differential processing and amplification processing on a light reception signal output from the photodetector 10a and a light reception signal output from the photodetector 10b.

S-polarized light reflected by the polarization beam splitter 4a is incident on the photodetector 10a. On the other hand, P-polarized light transmitted through the polarization beam splitter 4a and reflected by the mirror 48 is incident on the photodetector 10b.

A light reception signal intensity $I_{PD1}$ of the S-polarized light incident on the photodetector 10a is represented by the following equation.

$$I_{PD1} = \frac{a_m^2 + a_d^2}{2} + a_m \cdot \frac{a_d}{2} \cos(2\pi f_m t - X(t)) \quad (20)$$

A light reception signal intensity $I_{PD2}$ of the P-polarized light incident on the photodetector 10b is represented by the following equation.

$$I_{PD2} = \frac{a_m^2 + a_d^2}{2} - a_m \cdot \frac{a_d}{2} \cos(2\pi f_m t - X(t)) \quad (21)$$

In the above equations (20) and (21), the first term represents a DC component and the second term represents an AC component, respectively.

Therefore, the differential amplifier circuit 56 performs differential processing for calculating a difference $I_{PD1}-I_{PD2}$ between the light reception signal intensity $I_{PD1}$ and the light reception signal intensity $I_{PD2}$. As a result of this processing, the DC component is cut, and the difference $I_{PD1}-I_{PD2}$ is represented only by the amplified AC component as shown in the following equation.

$$I_{PD1-PD2}=2a_m a_d \cos(2\pi f_m t - X(t)) \quad (22)$$

Therefore, according to this modification example, by performing differential processing using the two photodetectors 10a and 10b, the DC component that becomes noise in the demodulation of the sample signal can be cut, and the AC component can be acquired with a higher intensity. Therefore, the demodulation accuracy of the sample signal can be further improved.

Even in the above-mentioned modification example, the same effect as that of the above-described embodiment can be obtained.

Although the laser interferometer according to the present disclosure has been described above based on the illustrated embodiment, the laser interferometer according to the present disclosure is not limited to the above-described embodiment, and the configuration of each section can be replaced with any configuration having the same function. Further, any other component may be added to the laser interferometer according to the embodiment.

What is claimed is:

1. A laser interferometer comprising:
    a light source that emits first laser light;
    an optical modulator that includes a vibrator and modulates the first laser light by using the vibrator to generate second laser light including a modulated signal;
    a photodetector that receives interference light between third laser light including a sample signal generated by reflecting the first laser light on an object and the second laser light to output a light reception signal;
    a demodulation circuit that demodulates the sample signal from the light reception signal based on a reference signal; and
    an oscillation circuit that outputs the reference signal to the demodulation circuit,
    wherein the vibrator is a signal source of the oscillation circuit,
    the vibrator has a crystal AT resonator, and the crystal AT resonator is configured to vibrate by thickness sliding along a vibration direction,
    a diffraction grating is formed on a surface of the crystal AT resonator, and the diffraction grating is configured with a plurality of grooves,
    the second laser light is formed by modulating the first laser light at the plurality of grooves, and
    an extending direction of each of the plurality of grooves is perpendicular to the vibration direction.

2. The laser interferometer according to claim 1, wherein the vibrator modulates the first laser light into the second laser light by vibration, and
    the oscillation circuit generates the reference signal based on a signal derived from the vibration of the vibrator.

3. The laser interferometer according to claim 2, wherein the light source includes a semiconductor laser element.

4. The laser interferometer according to claim 3, wherein the sample signal is a phase signal or a frequency signal.

5. The laser interferometer according to claim 2, wherein the optical modulator includes a housing that houses the vibrator, and
    the oscillation circuit is housed in the housing.

6. The laser interferometer according to claim 5, wherein the sample signal is a phase signal or a frequency signal.

7. The laser interferometer according to claim 2, wherein the sample signal is a phase signal or a frequency signal.

8. The laser interferometer according to claim 1, wherein the light source includes a semiconductor laser element.

9. The laser interferometer according to claim 8, wherein the sample signal is a phase signal or a frequency signal.

10. The laser interferometer according to claim 1, wherein the optical modulator includes a housing that houses the vibrator, and
    the oscillation circuit is housed in the housing.

11. The laser interferometer according to claim 10, wherein the sample signal is a phase signal or a frequency signal.

12. The laser interferometer according to claim 1, wherein the sample signal is a phase signal or a frequency signal.

* * * * *